United States Patent
Shimura et al.

(10) Patent No.: US 8,325,361 B2
(45) Date of Patent: Dec. 4, 2012

(54) APPARATUS, SYSTEM, AND METHOD FOR IMAGE PROCESSING FOR GENERATING AND/OR MANAGING A CONFIDENTIAL DOCUMENT

(75) Inventors: Hiroshi Shimura, Yokosuka (JP); Masaaki Ishikawa, Tokyo (JP); Haike Guan, Yokohama (JP); Taeko Ishizu, Yokohama (JP); Takashi Saitoh, Tokyo (JP); Hiroyuki Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1033 days.

(21) Appl. No.: 12/314,213

(22) Filed: Dec. 5, 2008

(65) Prior Publication Data
US 2009/0147292 A1 Jun. 11, 2009

(30) Foreign Application Priority Data

Dec. 6, 2007 (JP) .................................. 2007-316315

(51) Int. Cl.
G06F 3/12 (2006.01)
H04N 1/60 (2006.01)
H04N 1/40 (2006.01)
G06K 15/00 (2006.01)

(52) U.S. Cl. ...... 358/1.15; 358/1.9; 358/3.28; 358/1.18; 235/468

(58) Field of Classification Search ............... 345/629
See application file for complete search history.

(56) References Cited

U.S. PATENT DOCUMENTS

| | | | |
|---|---|---|---|
| 5,486,686 | A | 1/1996 | Zdybel, Jr. et al. |
| 5,604,596 | A | 2/1997 | Ukai et al. |
| 5,647,010 | A | 7/1997 | Okubo et al. |
| 5,798,844 | A | 8/1998 | Sakano et al. |
| 6,903,833 | B1 | 6/2005 | Murata et al. |
| 2005/0041263 | A1 | 2/2005 | Ishikawa et al. |
| 2005/0078331 | A1 | 4/2005 | Guan et al. |
| 2007/0019245 | A1 | 1/2007 | Katsurabayashi |
| 2007/0104007 | A1 * | 5/2007 | Mizuno .................. 365/221 |

FOREIGN PATENT DOCUMENTS

| | | |
|---|---|---|
| EP | 0 843 237 | 5/1998 |
| JP | 04-310175 | 11/1992 |
| JP | 11-355557 | 12/1999 |
| JP | 2000-175057 | 6/2000 |
| JP | 2000-278502 | 10/2000 |
| JP | 2001-086330 | 3/2001 |
| JP | 2004-222141 | 8/2004 |
| JP | 2005-197824 | 7/2005 |
| JP | 2006-253907 | 9/2006 |
| JP | 2007-074078 | 3/2007 |
| JP | 2007-241494 | 9/2007 |

OTHER PUBLICATIONS

Japanese Office Communication dated Jan. 10, 2012 issued in Japanese Patent Application No. 2007-316315.
Extended European Search Report dated Mar. 3, 2009 for corresponding Application No. 08253915.6.
Japanese Office Communication dated May 15, 2012 issued in Japanese Patent Application No. 2007-316315.

* cited by examiner

*Primary Examiner* — Thomas Lett
(74) *Attorney, Agent, or Firm* — Harness, Dickey & Pierce, P.L.C.

(57) ABSTRACT

A confidential document is generated by encoding distribution destination information specifying a destination to which the confidential document will be distributed.

16 Claims, 16 Drawing Sheets

| MEETING ID | DATE AND TIME | TITLE | PLACE | ORGANIZER | ATTENDANTS | |
|---|---|---|---|---|---|---|
| 001 | xxxx/xx/xx xx:xx | ○○○ | AAA | aaa | ＊＊＊＊＊ | |
| 002 | xxxx/xx/xx xx:xx | ××× | BBB | bbb | ＊＊＊＊＊ | |
| 003 | xxxx/xx/xx xx:xx | △△△ | CCC | ccc | ＊＊＊＊＊ | ... |
| 004 | xxxx/xx/xx xx:xx | □□□ | DDD | ddd | ＊＊＊＊＊ | |

FIG. 9

MEETING INFORMATION

MEETING ID: 00     TITLE: ○○○     PLACE: AAA

DATE AND TIME: xxxx/xx/xx xx:xx

ORGANIZER: aaa

ATTENDANTS

☑ ATTENDANT 1

☑ ATTENDANT 2

☑ ATTENDANT 3

☑ ATTENDANT 4

☑ ATTENDANT 5

| LOG ID | DOCUMENT ID | EVENT | FIRST USER ID | DATE AND TIME | MACHINE ID | ORIGINAL DATA | | DISTRIB-UTED | SECOND USER ID | RE-CEIVED | DE-STROYED |
|---|---|---|---|---|---|---|---|---|---|---|---|
| | | | | | | ELECTRONIC DOCUMENT ID | PAPER DOCUMENT ID | | | | |
| 0000-0001 | 0001-0001 | PRINT | John (123-567) | 06/9/30 11:03 | aaa-bbb | xxx-yyy | | | James (123-456) | | |
| 0000-0002 | 0001-0002 | PRINT | John (123-567) | 06/9/30 11:04 | aaa-bbb | xxx-yyy | | | Mike (123-457) | | |
| 0000-0003 | 0001-0003 | PRINT | John (123-567) | 06/9/30 11:05 | aaa-bbb | xxx-yyy | | | Jacob (123-458) | | |
| | | | | | | | | | | | |
| | | | | | | | | | | | |
| | | | | | | | | | | | |
| | | | | | | | | | | | |

| LOG ID | DOCUMENT ID | EVENT | FIRST USER ID | DATE AND TIME | MACHINE ID | ORIGINAL DATA | | DISTRIB-UTED | SECOND USER ID | RE-CEIVED | DE-STROYED |
|---|---|---|---|---|---|---|---|---|---|---|---|
| | | | | | | ELECTRONIC DOCUMENT ID | PAPER DOCUMENT ID | | | | |
| 0000-0001 | 0001-0001 | PRINT | John (123-567) | 06/9/30 11:03 | aaa-bbb | xxx-yyy | | ○ | James (123-456) | ○ | |
| 0000-0002 | 0001-0002 | PRINT | John (123-567) | 06/9/30 11:04 | aaa-bbb | xxx-yyy | | ○ | Mike (123-457) | ○ | |
| 0000-0003 | 0001-0003 | PRINT | John (123-567) | 06/9/30 11:05 | aaa-bbb | xxx-yyy | | ○ | Jacob (123-458) | ○ | ○ |
| ... | ... | ... | ... | | | | | | | | |
| 0000-0111 | 0001-0010 | COPY | James (123-456) | 06/10/30 15:21 | ccc-ddd | | 0001-0001 | | Daniel (123-568) | | |
| 0000-0112 | 0001-0011 | COPY | James (123-456) | 06/10/30 15:22 | ccc-ddd | | 0001-0001 | | Chris (123-569) | | |
| ... | ... | ... | ... | | | | | | | | |
| 0000-0200 | 0001-0013 | RE-PRINT | James (123-456) | 06/11/01 09:58 | ccc-ddd | xxx-yyy | | | Mary (123-570) | | |

APPARATUS, SYSTEM, AND METHOD FOR IMAGE PROCESSING FOR GENERATING AND/OR MANAGING A CONFIDENTIAL DOCUMENT

CROSS-REFERENCE TO RELATED APPLICATIONS

This patent application is based on and claims priority under 35 U.S.C. §119 to Japanese Patent Application No. 2007-316315, filed on Dec. 6, 2007, in the Japanese Patent Office, the disclosure of which is hereby incorporated herein by reference.

FIELD OF THE INVENTION

The present invention generally relates to an apparatus, system, and method of image processing, and more particularly relate to an apparatus, system, and method of generating a confidential document or managing the confidential document.

BACKGROUND

Recent image forming apparatuses are provided with the function of embedding information to a confidential document, which may be used to prevent the confidential document from being copied, for example, as described in the U.S. Pat. Nos. 5,604,596, 5,798,844, 5,486,686, and 5,647,010, the US Patent Application Publication No. 2005/078331 and the Japanese Patent Application Publication No. 2001-086330.

Further, information being embedded into a confidential document may be used to trace the confidential document. In one example, information regarding a user who creates the confidential document may be embedded at the time of generating the confidential document. In another example, the Japanese Patent Application Publication No. H11-355557 discloses a technique that embeds information regarding a user who copies the confidential document at the time of copying the confidential document. Such information may be used to trace the confidential document when the confidential document is leaked to a third person.

SUMMARY

The above-described information being embedded may not be helpful in some cases. For example, information regarding the user who has generated or copied the confidential document does not tell who obtains or will obtain the confidential document once the confidential document is generated or copied. More specifically, information regarding a user who has copied the confidential document is obtained only when the user copies the confidential document. When the confidential document is not copied at all, information regarding the user who has the confidential document is not obtained such that tracing the confidential document may be difficult once the confidential document is distributed to a user other than the user who has created the confidential document.

In view of the above, the inventors of the present invention have discovered the need for embedding the other type of information into the confidential document, which improves traceability of the confidential document.

Example embodiments of the present invention include an image processing apparatus capable of generating a confidential document. The image processing apparatus includes: a document image generator to generate a document image from data to be processed into a confidential document; a destination data obtainer to obtain distribution destination information specifying a destination to which the confidential document will be distributed; a first image generator to generate a first image encoded with the distribution destination information and being imperceptible to the human; an image combining device to combine the document image and the first image into combined data; and an output device to output the combined data as the confidential document for distribution to the destination specified by the distribution destination information.

Example embodiments of the present invention include an image processing apparatus capable of managing copying of a confidential document. The image processing apparatus includes a user interface to receive a user instruction for copying the confidential document from a user; a scanner device to scan the confidential document into confidential document data; a data extractor to extract distribution destination information from the confidential document data when the distribution destination information is detected in the confidential document data; and a copy manager to determine whether the user who has input the user instruction for copying the confidential document matches a user identified using the distribution destination information being extracted from the confidential document data.

Example embodiments of the present invention include an image processing system capable of generating a confidential document. The image processing system includes: a document image generator to generate a document image from data to be processed into a confidential document; a destination data obtainer to obtain distribution destination information specifying a destination to which the confidential document will be distributed; a first image generator to generate a first image encoded with the distribution destination information and being imperceptible to the human; an image combining device to combine the document image and the first image into combined data; and an output device to output the combined data as the confidential document for distribution to the destination specified by the distribution destination information.

Example embodiments of the present invention include an image processing system capable of managing distribution of a confidential document. The image processing system includes a user interface to receive a user instruction for processing the confidential document from a user; a document input device to obtain confidential document data from the confidential document; a data extractor to extract distribution destination information from the confidential document data when the distribution destination information is detected in the confidential document data; and a copy manager to determine whether the user who has input the user instruction for processing the confidential document matches a user identified using the distribution destination information being extracted from the confidential document data.

Example embodiments of the present invention include an image processing method including: generating a document image from data to be processed into a confidential document; obtaining distribution destination information specifying a destination to which the confidential document will be distributed; generating a first image encoded with the distribution destination information and being imperceptible to the human; combining the document image and the first image into combined data; and outputting the combined data as the confidential document for distribution to the destination specified by the distribution destination information.

Example embodiments of the present invention include an image processing method including: receiving a user instruction for copying a confidential document from a user; scanning the confidential document into confidential document data; extracting distribution destination information from the confidential document data when the distribution destination information is detected in the confidential document data; and determining whether the user who has input the user instruction for copying the confidential document matches a user identified using the distribution destination information being extracted from the confidential document data.

In addition to the above-described example embodiments, the present invention may be practiced in various other ways, for example, as a recording medium storing a plurality of instructions, which causes a computer to perform any one of the above-described image processing methods and the methods described herein.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is an example screen including meeting information, which is displayed to a user, according to an example embodiment of the present invention;

FIG. 11 is a table illustrating log information being stored by a log manager provided in the image processing system of FIG. 1, according to an example embodiment of the present invention;

FIG. 17 is a table illustrating log information being stored by a log manager provided in the image processing system of FIG. 1, according to an example embodiment of the present invention.

Figure 1:
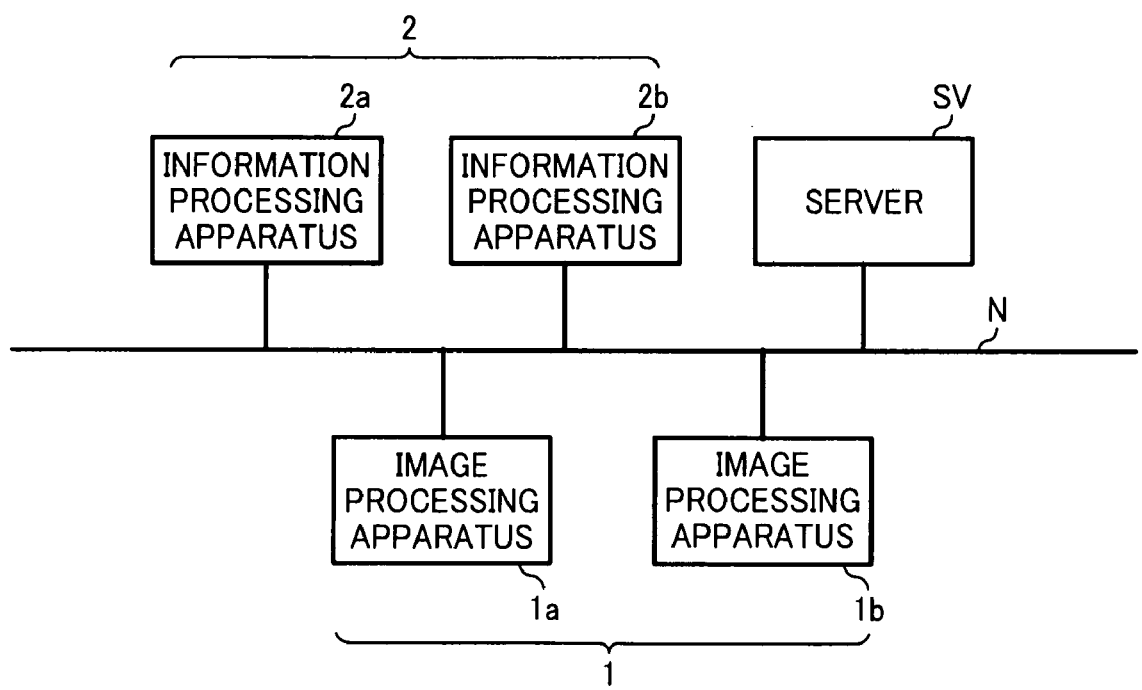
FIG. 1 is a configuration of an image processing system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a configuration of an image processing system is explained according to an example embodiment of the present invention. The image processing system of FIG. 1 includes an image processing apparatus 1*a*, an image processing apparatus 1*b*, an information processing apparatus 2*a*, an information processing apparatus 2*b*, and a server apparatus SV, which are connected with one another via a network N.

In this example, the information processing apparatuses 2*a* and 2*b*, which may be collectively referred to as the information processing apparatus 2, may each be implemented by any desired apparatus provided with a user interface and a network interface, such as a personal computer, a portable computer, a laptop computer, a personal digital assistant (PDA) device, a portable phone, a portable camera, etc. Specifically, in the following examples, the information processing apparatus 2 is implemented by a computer provided with an input device such as a mouse or a keyboard, an output device such as a display, a processor such as a central processing unit (CPU), a memory such as a hard disk drive (HDD), a random access memory (RAM), or a read only memory (ROM), and a network interface that allows communication with the image processing apparatus 1 via the network N. The image processing system of FIG. 1 may be provided with any desired number of information processing apparatuses 2.

The image processing apparatuses 1a and 1b, which may be collectively referred to as the image processing apparatus 1, may each be implemented by any desired apparatus capable of processing an image according to a user instruction input directly to the image processing apparatus 1 or indirectly through the information processing apparatus 2 or any device communicable with the image processing apparatus 1. In the following examples, the image processing apparatus 1 is implemented by a multifunctional apparatus (MFP) capable of performing a plurality of functions including, for example, the function of scanning, printing, faxing, copying, and communicating via the network N. Alternatively, any number of image processing apparatus 1 may be provided. Alternatively, the image processing apparatus 1 may be implemented by at least one or any combination of a plurality of image processing apparatuses including a printer, a scanner, a computer provided with the function of image processing, etc.

The server apparatus SV may be implemented by a computer including a memory and a processor. As described below, the image processing system of FIG. 1 may be provided with any desired number of server apparatuses SV The network N may be implemented by any desired network such as a local area network (LAN), a wide area network (WAN), or the Internet. The network N may be entirely or partially wireless.

In alternative to the configuration of FIG. 1, an image processing system of the present invention may be practiced in various other ways. For example, the information processing apparatus 2 or the server apparatus SV does not have to be provided.

Figure 2:
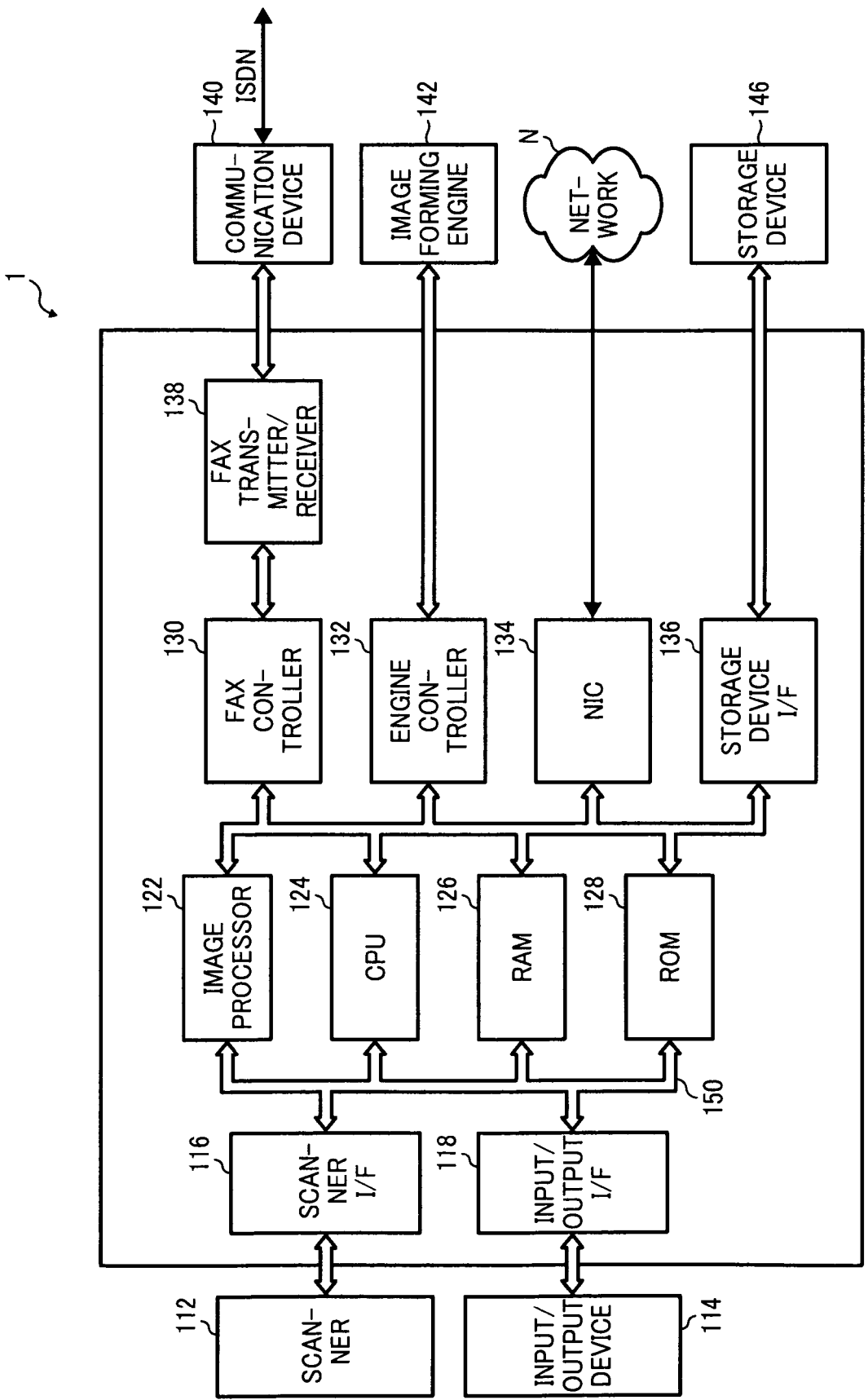
FIG. 2 is a schematic block diagram illustrating a hardware structure of an image processing apparatus shown in FIG. 1, according to an example embodiment of the present invention.

Referring now to FIG. 2, a hardware structure of the image processing apparatus 1 is explained according to an example embodiment of the present invention. The image processing apparatus 1 mainly includes a scanner 112, an input/output device 114, a scanner interface (I/F) 116, an input/output interface (I/F) 118, an image processor 122, a central processing unit (CPU) 124, a random access memory (RAM) 126, a read only memory (ROM) 128, a facsimile (fax) controller 130, an engine controller 132, a network interface controller (NIC) 134, a storage device interface (I/F) 136, a facsimile (fax) transmitter/receiver 138, a communication device 140, an image forming engine 142, and a storage device 146. As shown in FIG. 2, the above-described elements may be connected via a bus 150.

The scanner 112 scans a document into image data, and sends the image data to the image processor 122 through the scanner I/F 116. The scanner 112 may have any desired structure. For example, the scanner 112 may be provided with an automatic document feeder (ADF), which feeds the document to an image reading section of the scanner 112.

The input/output device 114 allows the user to communicate with the image processing apparatus 1 through the input/output I/F 118. For example, the input/output device 114 may include an input device capable of inputting a user instruction, such as a button, key, microphone, keyboard, etc., and an output device capable of outputting information generated by the image processing apparatus 1, such as a display including a liquid crystal display (LCD), buzzer, speaker, etc. The input/output device 114 may be provided in the form of an operation panel having a touch-panel screen. Through the input/output device 114, the user may input various information such as information regarding an emulation mode, Internet Protocol (IP) address, user name, etc.

The image processor 122 applies various image processing to the image data, which may be received from the scanner 112 through the scanner I/F 116. Alternatively, the image data may be received from the inside or outside of the image processing apparatus 1 through the fax controller 130, the NIC 134 or the storage device I/F 136. For example, the image processor 122 may apply various image processing, such as filtering, skew correction, edge enhancement, color conversion, data addition, data detection, and/or data extraction, to the image data received from the scanner 112 to generate processed image data. The image processor 122 may further send the processed image data to the engine controller 132 for printing. Alternatively, the image processor 122 may store the processed image data in any desired memory or storage device, such as the RAM 126 or the storage device 146.

The fax controller 130 may convert the processed image data to fax image data, such as the fax image data having G3 or G4 format. The fax transmitter/receiver 138 may be implemented by any desired communication device, such as a modem, which allows the fax controller 130 to communicate through a public switched telephone network (PSTN). The communication device 140 may be implemented by any desired communication device, such as a digital service unit (DSU) and terminal adopter (TA), a TA incorporating the DSU, etc., which allows the fax controller 130 to communicate through an integrated services digital network (ISDN). In addition to the function of sending or receiving fax image data, the facsimile controller 130 may receive or send email data using the point-to-point protocol (PPP).

The engine controller 132 causes the image forming engine 142 to form an image using information contained in the processed image data according to the default settings of the image processing apparatus 1 or the settings set by the user. The engine controller 132 may control operation of the image forming engine 142 directly or through a bus such as a universal serial bus (USB), IEEE 1284, or peripheral component interconnect (PCI).

The image forming engine 142 may include a plurality of devices to be used for image forming, including an exposure device, charging device, photoconductor such as a photoconductive drum, developing device, transfer device including an intermediate transfer body, a fixing device, etc.

The NIC 134 may be implemented by, for example, a network interface card, which allows the image processing apparatus 1 to communicate through the network N in compliance with the Ethernet such as 1000 BASE-TX. For example, the image processing apparatus 1 may function as a remote printer that may be used by a user through the information processing apparatus 2. In another example, the image processing apparatus 1 may be provided with the function of sending or receiving email data in compliance with the SMTP/POP protocol. In another example, the image processing apparatus 1 may communicate with the outside apparatus, such as the server apparatus SV, through the network N.

The storage device I/F 136 may allow the image processing apparatus 1 to communicate with the storage device 146 in compliance with any desired standard such as Small Computer System Interface (SCSI), Universal Serial Bus (USB), or the Advanced Technology Attachment (ATA) standards including, for example, Serial ATA, ATA Packet Interface (ATAPI), or ATA-4. The storage device 146 may be implemented by, for example, a hard disk drive, secure digital (SD) card, memory stick, digital versatile disc (DVD), magneto-optical (MO) disc, or flexible disk. For example, the storage device 146 may store any desired data, such as image data to be processed by the image processing apparatus 1, user information that may help to identify a specific user, etc.

The CPU 124 may function as a system controller, which controls operation of the image processing apparatus 1. The CPU 124 may be implemented by any desired processor including, for example, Pentium-based processor, Pentium IV-based processor, Pentium compatible processor, Power PC-based processor, or MIPS-based processor.

The RAM 126 may function as a work area of the CPU 124, a buffer area for storing the processed image data, a buffer area for storing the user instruction, or a bitmap memory for storing video data converted from the processed image data. In this example, the RAM 126 may be implemented by volatile memory and/or non-volatile memory.

The ROM 128 may store various data including a confidential document processing program to be executed by the CPU 124. For example, upon activation of the image processing apparatus 1 or upon receiving a request from the user, the CPU 124 may load the confidential document processing program from the ROM 128 onto the RAM 126, and perform processing according to the loaded program. In such case, the RAM 126 may function as a work memory of the CPU 124. Alternatively, the program may be stored in any other memory or storage device, such the storage device 146, the information processing apparatus 2, or the server apparatus SV.

Figure 3:
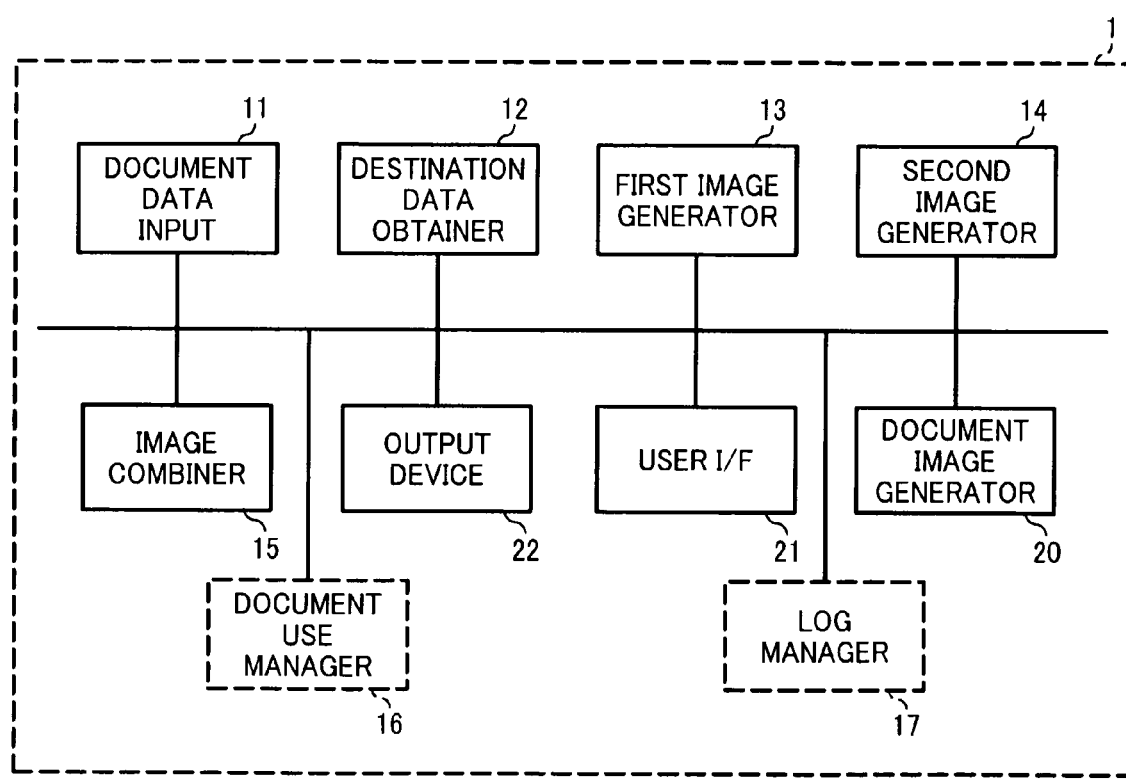
FIG. 3 is a schematic block diagram illustrating a functional structure of the image processing apparatus shown in FIG. 1, according to an example embodiment of the present invention.

Referring now to FIG. 3, a functional structure of the image processing apparatus 1 of FIG. 2 is explained according to an example embodiment of the present invention. More specifically, upon loading the confidential document processing program, the image processing apparatus 1 may be caused to have the functional structure shown in FIG. 3. The image processing apparatus 1 includes a document data input 11, a destination data obtainer 12, a first image generator 13, a second image generator 14, an image combiner 15, a document use manager 16, a log manager 17, a document image generator 20, a user interface 21, and an output device 22, which may be connected via an internal bus. Any one of the document user manager 16 and the log manager 17 may not be provided. As described below, using at least one of the elements shown in FIG. 3, the image processing apparatus 1 may process document data into a confidential document encoded with distribution destination information specifying a destination to which the confidential document will be distributed.

The document data input 11 inputs data to be processed as document data. In one example, the document data input 11 may receive print data, which is written in page description language (PDL) format by the information processing apparatus 2, from the network N through the NIC 134 (FIG. 2). In such case, the information processing apparatus 2 is provided with a printer driver capable of generating print data in PDL format, and a network interface capable of sending the print data to the image processing apparatus 1. The image processing apparatus 1 receives the print data through the NIC 134.

In another example, the document data input 11 may obtain data to be processed from a memory provided in the image processing apparatus 1 or a memory readable by the image processing apparatus 1, such as the storage device 146 (FIG. 2). In another example, the document data input 11 may obtain data to be processed from a facsimile apparatus through the fax transmitter/receiver 138 (FIG. 2). In another example, the document data input 11 may obtain data to be processed from the scanner 112 (FIG. 2).

The destination data obtainer 12 obtains distribution destination information, which specifies a destination to which the confidential document will be distributed after the confidential document is output by the image processing apparatus 1. The distribution destination information may be used to identify a specific user who will have the confidential document. Examples of the distribution destination information include, but not limited to, user identification information for identifying a user who will have the confidential document such as a user name or a user ID uniquely assigned to the user, group identification information such as a group to which a specific user who will have the confidential document belongs, document identification information such as a document ID uniquely assigned to each confidential document when a specific job is performed that causes encoding of the distribution destination information into the confidential document, etc. The user name may be any one of the user's full name, family name, given name, handle name, etc.

In this example, the destination data obtainer 12 may obtain distribution destination information in various ways. In one example, the information processing apparatus 2 may receive the distribution destination information input by the user through the printer driver, and send the distribution destination information as attribute data together with the print data. In such case, the image processing apparatus 1 receives the distribution destination information from the NIC 134 (FIG. 2). In another example, the distribution destination information may be input as setting data by the user through the input/output device 114 (FIG. 2). In another example, the input/output device 114 may provide a screen through the input/output device 114 or the NIC 134 that allows the user to select one or more users from a list of users, which may be read out from a memory such as the storage device 146 (FIG. 2). Alternatively, the distribution destination information may be obtained from the server apparatus SV or any memory provided in the image processing apparatus 1, using information that is stored in a manner corresponding to the distribution destination information such as document use information described below.

The document image generator 20 generates a document image from the document data obtained by the document data input 11. For example, the document image generator 20 may deploy the document data received from the document data input 11 using the image processor 122 (FIG. 1), and stores the deployed image as the document image in a memory such as the RAM 126.

The first image generator 13 generates a first image having the distribution destination information being encoded in a manner imperceptible to the human. In addition to the destination distribution information, any other information or data may be encoded into the first image, such as information indicating that the confidential document is prohibited from being copied. The first image may be generated in various ways using any known technique as long as the resultant first image is imperceptible to the human when combined into the combined data. For example, the first image may be generated in a manner imperceptible to the human eye. In another example, the first image may be generated in a manner not understandable to the human or decodable by the human even though it may be perceptible to the human such as to the human eye.

For example, the first image generator 13 may generate the first image by converting the distribution destination information to a plurality of dots, which is not readable by the human or understandable by the human, as described in the US Patent Application Publication No. 2005/0041263, the entire contents of which are hereby incorporated by reference herein. Alternatively, the first image generator 13 may generate the first image by converting the distribution destination information to any graphical image having a specific pattern, shape or color, which is not readable by the human or understandable by the human. Alternatively, the first image generator 13 may generate the first image by converting the distribution destination information to any graphical image, which is to be printed using the specialized ink that causes the resultant printed graphical image to be imperceptible to the human. Alternatively, as described in the US Patent Application Publication No. 2006/0147084, the first image generator 13 may convert the distribution destination information into a parameter, which may be used to change the space between characters selected from the document image. The space having a length being changed according to the distribution destination information may be further adjusted so as to be imperceptible to the human. Alternatively, the first image generator 13 may convert the distribution destination information into a parameter, which may be used to change the shape of the selected character in the document image, such as its outline, in a manner imperceptible to the human. In this example, information necessary for encoding such as a pattern to be used for encoding may be provided in any desired memory such as the storage device 146.

In one example, the first image may be combined with the document image such that the first image may be embedded in one portion of the combined data, for example, as a barcode. In another example, the first image may be combined with the document image such that the first image is embedded in a background portion of the combined data throughout the entire portion of the combined data. In another example, the first image may be combined with the document image such that the first image is embedded in a portion of the combined data that corresponds to the space between characters or the space where the character is not to be printed.

The second image generator 14 generates a second image having user identification information that identifies a user who will have the confidential document in a manner perceptible to the human. For example, the second image generator 14 may obtain a user name of the user who will have the confidential document using the distribution destination information obtained by the destination data obtainer 12, and generate an image having the user name. Alternatively or additionally, the second image generator 14 may generate a second image having information that identifies a group to which the user who will have the confidential document belongs in a manner perceptible to the human. In this example, the second image generator 14 may obtain the user identification information through a user instruction, which may be input directly or indirectly to the image processing apparatus 1. In one example, the image being perceptible to the human may include any image perceptible to the human eye. In another example, the image being perceptible to the human may include any image understandable or decodable by the human even when the image is not perceptible to the human such as to the human eye.

The image combiner 15 combines the document image, the first image, and the second image into combined data.

Figure 4:
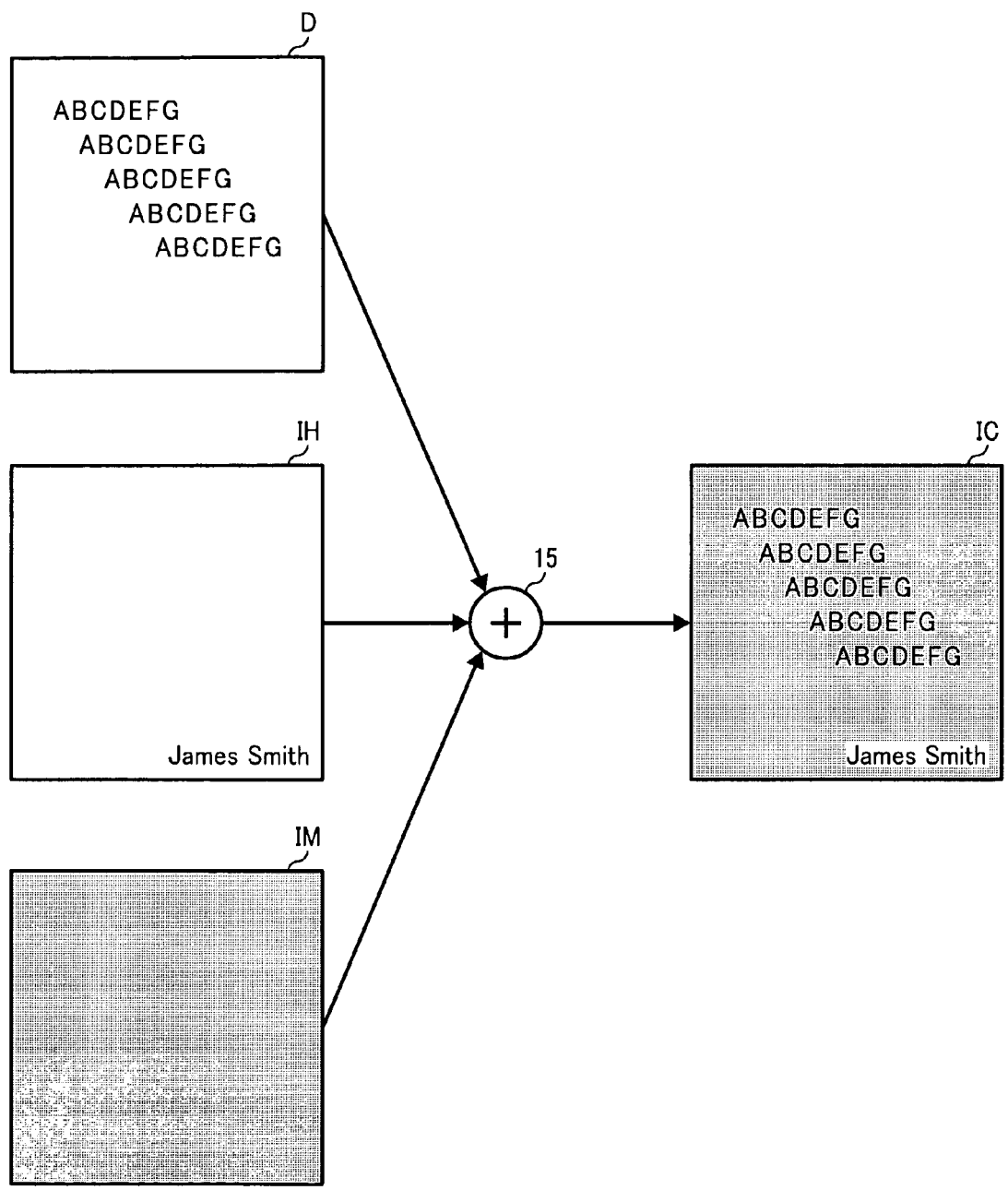
FIG. 4 is an illustration for explaining operation of generating a confidential document, performed by the image processing apparatus shown in FIG. 1, according to an example embodiment of the present invention.

For example, referring to FIG. 4, the image combiner 15 may receive the document image D from the document image generator 20, the second image IH from the second image generator 14, and the first image IM from the first image generator 13, and combines the obtained images into combined data IC. The combined data IC may be further output as the confidential document for distribution to a specific user.

In this example, the document image D may contain information taken from the document data such as character or picture data. The second image IH may contain the name of the user who will have the confidential document in a manner perceptible to the human. The first image IM may contain the destination distribution information in a manner imperceptible to the human, such as a plurality of dots converted from the user identification information of the user who will have the confidential document. The plurality of dots may be sequentially embedded in a background portion of the combined data IC throughout the entire image. With the plurality of dots being sequentially embedded throughout the entire image, the destination identification information may be easily extracted from the confidential document even when a part of the confidential document is lost at the time of extracting the destination identification information.

The output device 22 outputs the combine data for distribution to the user. For example, the output device 22 may output the combined data, and causes the image forming engine 142 (FIG. 2) to form an image according to the combined data on a recording sheet to obtain the resultant confidential document. Alternatively, the combined data output by the output device 22 may be stored in the storage device 146, or sent to the outside apparatus through the fax transmitter/receiver 138 or the NIC 134. For the illustrative purposes, in this example, the confidential document to be distributed in a paper form and the confidential document data to be distributed in an electronic form may be collectively referred to as the confidential document.

The user I/F 21 receives a user instruction from the user or provides information to the user, for example, using the input/output I/F 118 or the NIC 134.

The document use manager 16, which may be optionally provided, manages document use information regarding the intended use of the confidential document generated by the image processing apparatus 1. Examples of the document use information include, but not limited to, meeting information regarding a meeting where the confidential document is distributed such as the date or place where the meeting is held, etc.

The log manager 17, which may be optionally provided, manages log information regarding a job performed on the confidential document. Examples of the job include, but not limited to, generating the confidential document, copying the confidential document, reprinting the confidential document, distributing the confidential document, receiving the confidential document, and destroying the confidential document.

Figure 5:
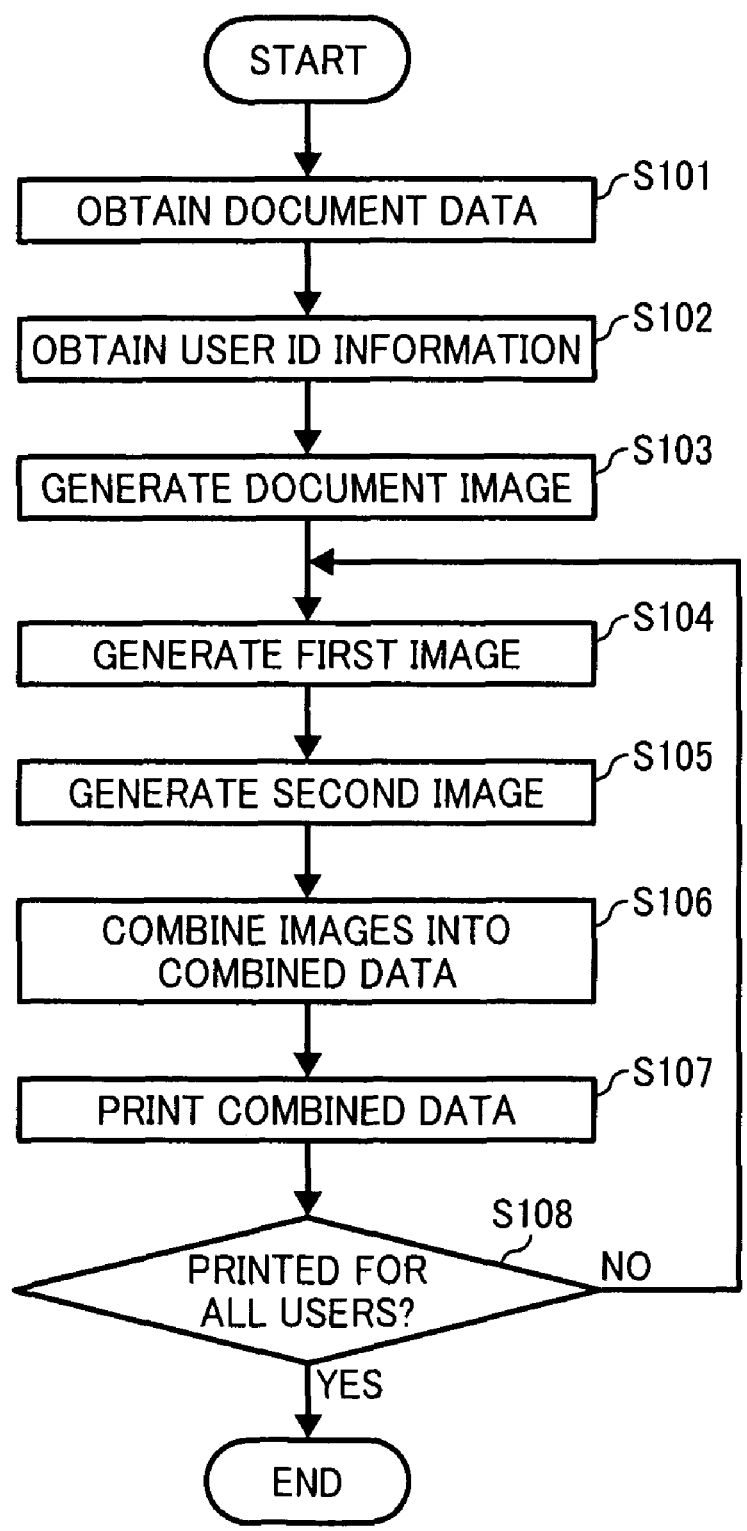
FIG. 5 is a flowchart illustrating operation of generating a confidential document, according to an example embodiment of the present invention.

Referring now to FIG. 5, operation of generating a confidential document, performed by the image processing apparatus 1, is explained according to an example embodiment of the present invention. For the illustrative purpose, the following example assumes that the user generates a confidential document, which is to be distributed to a plurality of users who will attend a meeting.

At S101, the document data input 11 obtains data to be processed as document data. For example, the user at the information processing apparatus 2 generates document data using an application installed on the information processing apparatus 2, and generates print data from the document data using a printer driver being installed on the information processing apparatus 2. When generating the print data, the user at the information processing apparatus 2 may input document use information, for example, meeting information regarding the meeting where the confidential document is distributed, through the printer driver. The printer driver may send the document use information together with the print data to the image processing apparatus 1. One example operation of S101 is described below referring to FIG. 6.

At S102, the destination data obtainer 12 of the image processing apparatus 1 obtains user identification information using the document use information received from the information processing apparatus 2. In this example, the destination data obtainer 12 obtains a list of attendants previously prepared for the meeting, and sends the list of attendants to the information processing apparatus 2. The user at the information processing apparatus 2 selects one or more users from the list of attendants as a user who will have the confidential document, and sends information regarding the selected users to the image processing apparatus 2. Based on the information regarding the selected users, the destination data obtainer 12 may obtain, for each one of the selected users, the user identification information such as the user name or the user ID. One example operation of S102 is described below referring to FIG. 6.

At S103, the document image generator 20 generates a document image from the document data received by the document data input 11. The document image may be stored in a memory, such as the RAM 126 or the storage device 146.

At S104, the first image generator 13 generates a first image, which is imperceptible to the human, using the user identification information obtained by the destination data obtainer 12. For example, the first image generator 13 arbitrarily selects one of the selected users, and obtains the user identification information that corresponds to the selected one of the selected users. As described above referring to FIG. 4, the first image generator 13 may generate the first image by converting the user identification information to a plurality of dots that is imperceptible to the human. The first image may be stored in a memory, such as the RAM 126 or the storage device 146.

At S105, the second image generator 14 generates a second image, which is perceptible to the human, which contains the user name of the selected one of the selected users who will have the confidential document, for example, as described above referring to FIG. 4. For example, for the selected one of the selected users, the image processing apparatus 1 may obtain the user name that corresponds to the user identification information that is encoded into the first image. The second image may be stored in a memory, such as the RAM 126 or the storage device 146.

At S106, the image combiner 15 combines the document image, the first image, and the second image into combine data, for example, as described above referring to FIG. 4, to generate combined data for the selected one of the selected users.

At S107, the output device 22 forms an image of the combined data on a recording sheet to generate a confidential document for the selected one of the selected users.

S108 determines whether the confidential document has been output for all selected users who will have the confidential document. When the confidential document has been output for all selected users ("YES" at S108), the operation ends. When the confidential document has not been output for all selected users ("NO" at S108), the operation returns to S104 to newly select one of the selected users, and repeat S104 to S107 for the newly selected one of the selected users.

The operation of FIG. 5 may be performed in various other ways. For example, the steps of the operation of FIG. 5 may be performed in an order different from the order described above.

In another example, at S101, when instructing the image processing apparatus 1 to print a confidential document, the user at the information processing apparatus 2 may input user identification information for identifying a user who will have the confidential document. For example, the server SV of FIG. 1 or the image processing apparatus 1 may store user information that helps to identify a specific user including, for example, the user ID such as the employee ID, the user name, etc. The information processing apparatus 2 may access the user information through the network N, and generate a screen including the user information for display to the user. When the user selects one or more users, the information processing apparatus 2 sends user identification information regarding the selected users to the image processing apparatus 2.

In another example, at S104, the first image generator 13 may encode additional information together with the user identification information into the first image. For example, the first image generator 13 may encode copy guard information indicating whether copying the confidential document is prohibited, for example, as described in the US Patent Application Publication No. 2005/0078331, the entire contents of which are hereby incorporated by reference herein. The image processing apparatus 1 may encode the copy guard information according to a user instruction received from the user I/F 21.

In another example, the first image generator 13 may encode user identification information indicating a user who generates a confidential document, which may be obtained from the information processing apparatus 1 together with the document data. Alternatively, when the user instruction is input through the input/output device 114, the image processing apparatus 1 may request the user to enter user identification information through the input/output device 114 or request the user to insert an IC card storing information regarding the user.

In another example, the first image generator 13 may encode user identification information for a plurality of users including all users who are authorized to have the confidential document. For example, when the user intends to distribute the confidential document to all members of one team, the user may only distribute one copy of the confidential document to a team manager. In such case, the first image generator 13 may automatically encode user identification information for all members in addition to the user identification information of the team manager, for example, by referring to a database storing information regarding the employees.

In another example, S105 of generating the second image may not be performed. In such case, the second image generator 14 of FIG. 4 may not be provided. For example, the resultant confidential document, which is not provided with the user name, may be desirable when a small number of users or user groups are selected as the user who will have the confidential document. When a large number of users or user groups are selected as the user who will have the confidential document, generation of the second image may be desirable. When information regarding the user such as the user name is printed in a visible form, any person who is responsible for distributing may easily distribute the confidential document generated for a specific user to the specific user.

Figure 6:
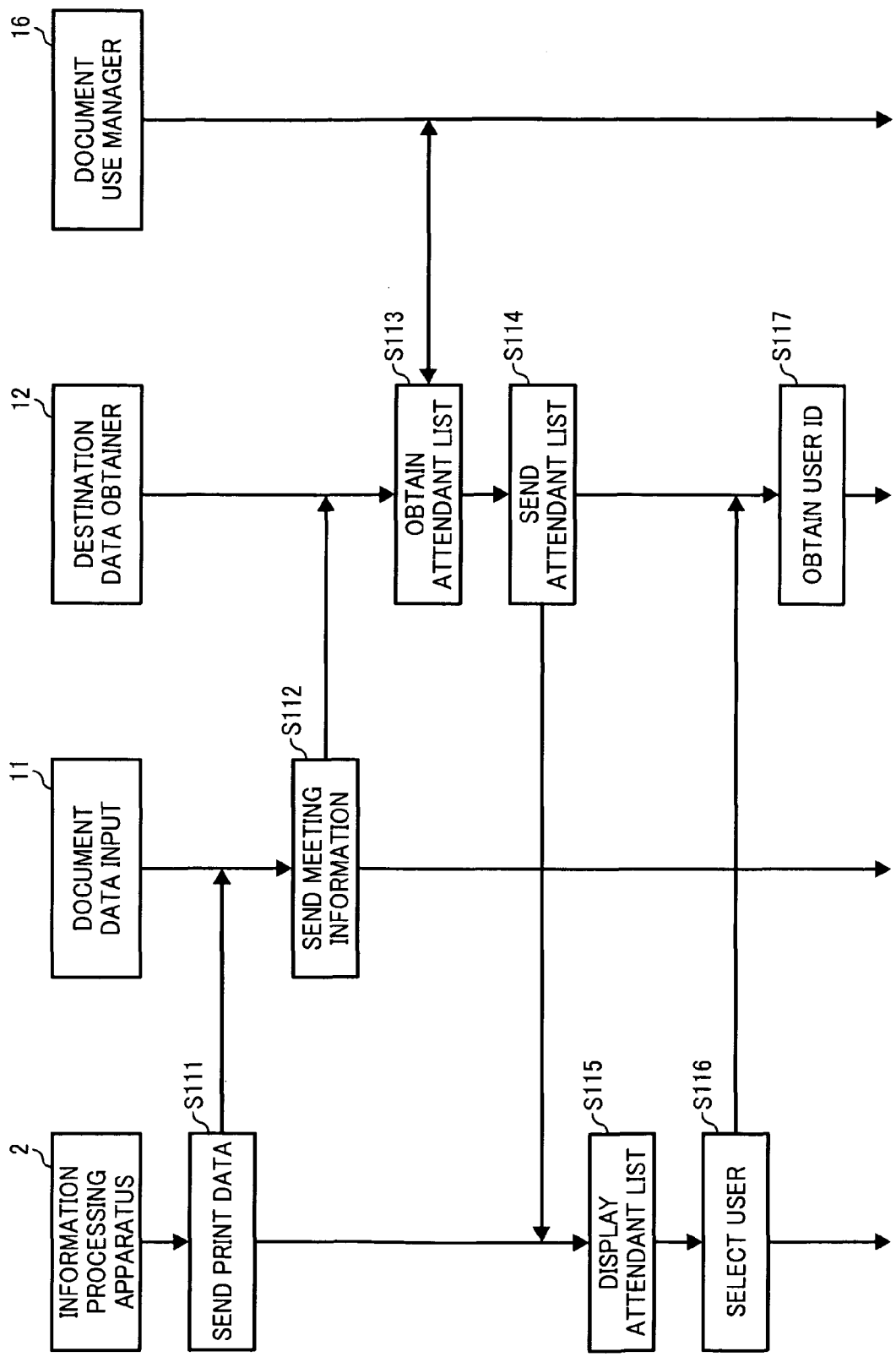
FIG. 6 is a data flow diagram illustrating operation of obtaining user identification information performed by the image processing system of FIG. 1, according to an example embodiment of the present invention.

Referring now to FIG. 6, operation of obtaining the user identification information, performed at S101 and S102 of FIG. 5, is explained according to an example embodiment of the present invention.

At S111, the information processing apparatus 2 sends the print data to be processed into a confidential document, along with an instruction for printing the print data into a confidential document, to the image processing apparatus 1 through the network N. As described above referring to FIG. 5, the print data is sent together with document use information regarding the intended use of the confidential document, for example, in the form of attribute data. Specifically, in this example, the meeting information regarding the meeting where the confidential document is distributed is sent to the image processing apparatus 1. Examples of the meeting information include, but not limited to, identification information that is uniquely assigned to a meeting such as the ID number or the meeting title, date/time information indicating the date and time when the meeting takes place, place information indicating the place where the meeting is held, and organizer information indicating a user or a group who organized the meeting.

At S112, the image processing apparatus 1 receives the print data and other information such as the meeting information from the information processing apparatus 2 through the NIC 134. The document data input 11 obtains the meeting information, and sends the meeting information to the destination data obtainer 12.

At S113, the destination data obtainer 12 requests the document use manager 16 to obtain user identification information that corresponds to the meeting information. Specifically, in this example, the destination data obtainer 12 requests for information regarding a list of attendants who will attend the meeting specified by the meeting information.

Figures 7, 8:
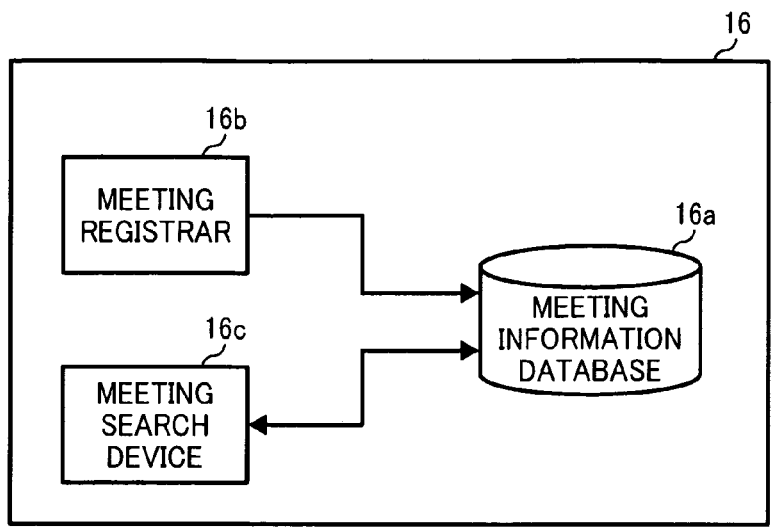
FIG. 7 is a schematic block diagram illustrating a structure of a document use manager provided in the image processing system of FIG. 1, according to an example embodiment of the present invention.
FIG. 8 is a table illustrating meeting information being stored by the document user manager of FIG. 7, according to an example embodiment of the present invention.

For example, referring to FIG. 7, the document use manager 16 may include a meeting information database 16a, a meeting registrar 16b, and a meeting search device 16c.

The meeting information database 16a, which may be implemented by any desired memory or storage device, stores meeting information previously registered by the meeting registrar 16b in a corresponding manner with user identification information previously registered by the meeting registrar 16b for each meeting. For example, as illustrated in FIG. 8, the meeting information database 16a includes various kinds of meeting information including meeting identification information ("MEETING ID") that is uniquely assigned to a meeting such as the ID number (ID) and the meeting title ("TITLE), date/time information ("DATE AND TIME") indicating the date and time when the meeting takes place, place information ("PLACE") indicating the place where the meeting is held, organizer information ("ORGANIZER") indicating a user or a group who organized the meeting. The meeting information database 16a further includes user identification information for identifying a user related to the meeting including attendant information ("ATTENDANTS") indicating one or more uses who will attend the meeting. In this example, the organizer information is treated as the meeting information. Alternatively, the organizer information may be treated as the user identification information. Further, the information regarding the meeting title may not be uniquely assigned such that the same title may be assigned to more than one meeting.

Referring back to FIG. 7, the meeting registrar 16b registers meeting information and user identification information to the meeting information database 16a according to a user instruction received through the information processing apparatus 2 or any other user interface such as the input/output device 114.

The meeting search device 16c searches the meeting information database 16a using the meeting information provided by the destination data obtainer 12 as a key to identify at least one meeting that matches the meeting information. Once the meeting is identified, the meeting search device 16c may obtain user identification information, such as attendant information that matches the identified meeting. In addition to the attendant information, the meeting search device 16c may obtain other kinds of information such as meeting information that matches the identified meeting. The obtained information may be sent to the destination data obtainer 12.

For example, when the destination data obtainer 12 receives the meeting identification information such as the meeting ID, the destination data obtainer 12 requests the document use manager 16 to obtain a list of attendants who will attend the meeting specified by the meeting ID by sending the meeting ID to the document use manager 16. The meeting search device 16c searches the meeting information database 16c to obtain information regarding a list of attendants for the meeting assigned with the received meeting ID. The meeting search device 16c sends the information regarding a list of attendants to the destination data obtainer 12. The meeting search device 16c may send other types of information regarding the identified meeting such as the date/time information or place information.

Referring back to FIG. 6, at S114, the destination data obtainer 12 sends the information regarding a list of attendants to the information processing apparatus 2.

At S115, the information processing apparatus 2 provides the information regarding a list of attendants to the user. For example, referring to FIG. 9, the information processing apparatus 2 may generate a screen including various information regarding the meeting specified by the meeting ID that the user has previously input, using the information obtained from the destination data obtainer 12. With this information, the user at the information processing apparatus 2 may obtain various information regarding the meeting. In addition to the information being illustrated in FIG. 9, the screen may include other components such as the "OK" button, "CANCEL" button, etc.

Further, in this example, the information processing apparatus 2 allows the user to select one or more uses from the list of attendants as selected users that the user at the information processing apparatus 2 intends to distribute the confidential document, for example, at the meeting. The screen of FIG. 9 may provide a check box for each one of the attendants, at the left side of the attendant name. In order to select a user who will have the confidential document, the user at the information processing apparatus 2 may check the check box that corresponds to the user to be selected with the input device such as the mouse provided with the information processing apparatus 2. After selection, the user may press the "Enter" key, which may be provided by the input device of the information processing apparatus 2. Alternatively, the screen of FIG. 9 may be provided with the "OK" button that allows the user to input an instruction for sending the information regarding the selection of the users to the image processing apparatus 1.

Alternatively, the screen of FIG. 9 may be provided such that all attendants being listed are selected by default. In such case, the user at the information processing apparatus 2 may uncheck an attendant that the user does not intend to distribute the confidential document using the input device.

When the selection on the user is input by the user, at S116, the information processing apparatus 2 may send information regarding the selected users to the image processing apparatus 1. In one example, the information processing apparatus 2 may send a list of the selected users who will have the confidential document as the information regarding the selected users. In another example, the information processing apparatus 2 may send a list of the unselected uses who will not have the confidential document as the information regarding the selected users. In another example, the information processing apparatus 2 may send information indicating each attendant is selected or unselected as the information regarding the selected users.

At S117, the destination data obtainer 12 obtains user identification information for each one of the selected users, and the operation may proceed to S103 of FIG. 5.

As described above referring to FIGS. 6 to 9, the document use manager 16 may be provided, which manages document use information such as meeting information in a corresponding manner with user identification information. In one example, the document use manager 16, or any one of its components, may be provided in the image processing apparatus 1 as illustrated in FIG. 3. In another example, the document use manager 16, or any one of its components, may be provided outside the image processing apparatus 1, for example, as the server SV as illustrated in FIG. 1. Specifically, in the above-described example, the user at the information processing apparatus 2 inputs a user instruction for generating a confidential document for distribution to a selected user who will attend the meeting. When the user instruction is received, the image processing apparatus 1 automatically generates a confidential document for the selected user by encoding user identification information specific to the selected user. Once the meeting information is registered to the document use manager 16, the user does not have to input user identification information, which may take time especially when a large number of users are planning to attend.

The operation of FIG. 6 may be performed in various other ways. For example, the user at the information processing apparatus 1 may provide meeting information other than the meeting ID, such as date information regarding the date when the meeting is held, title information regarding the title of the meeting, place information regarding the place where the meeting is held, or organizer information regarding the user who organizes the meeting. For example, assuming that the date information is provided, the meeting search device 16c may obtain information regarding all meetings that are registered for the date specified by the user, and send the obtained information to the information processing apparatus 2 through the destination data obtainer 12. When information regarding the meetings is obtained, the information processing apparatus 2 may request the user to select one meeting, and further one or more users that the user intends to distribute the confidential document at the selected meeting. By obtaining the user selection from the information processing apparatus 2, the image processing apparatus 1 may print a confidential document for each one of the selected users for the selecting meeting.

Figure 10:
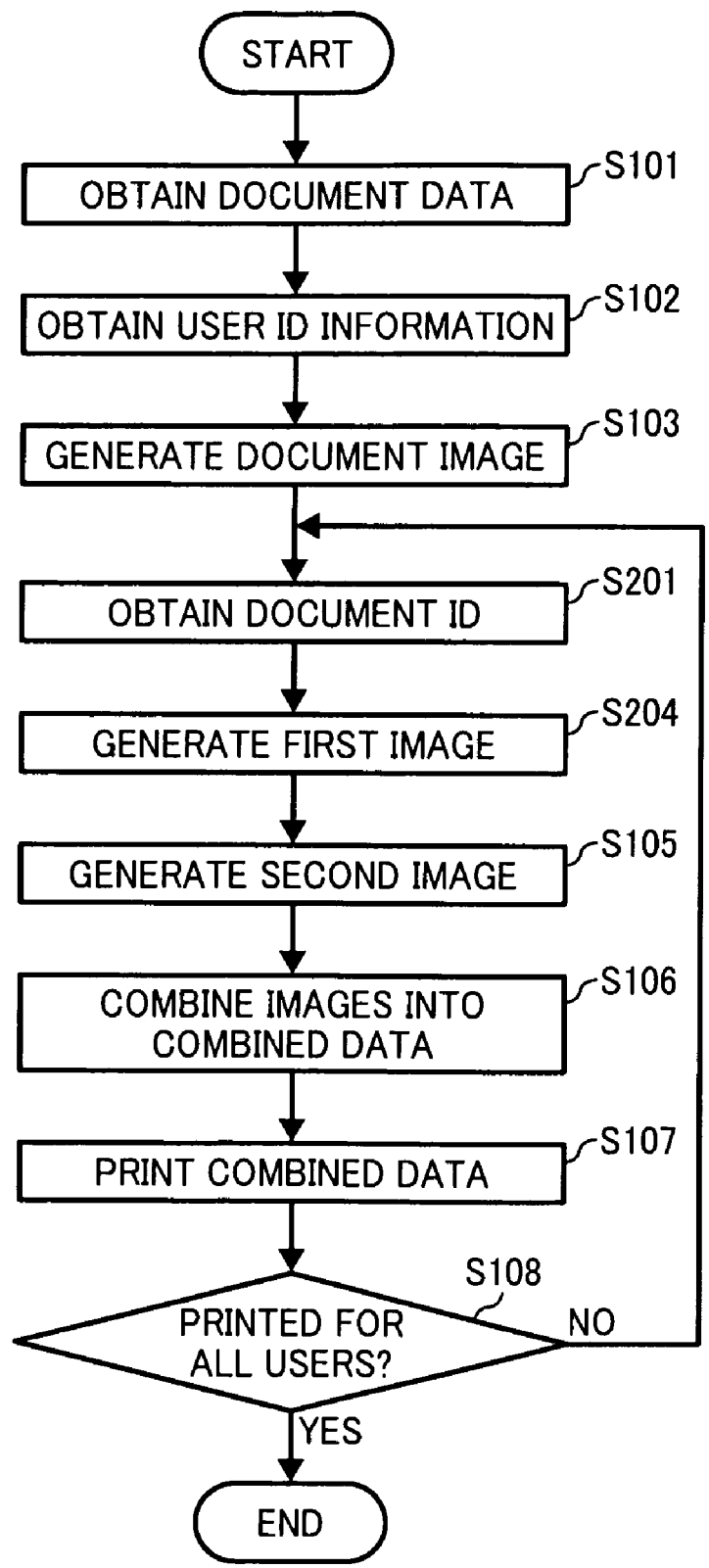
FIG. 10 is a flowchart illustrating operation of generating a confidential document, according to an example embodiment of the present invention.

Referring now to FIG. 10, operation of generating a confidential document, performed by the image processing apparatus 1, is explained according to an example embodiment of the present invention. For the illustrative purpose, the following example assumes that the user generates a confidential document, which is to be distributed to a plurality of users who will attend a meeting. The operation of FIG. 10 is substantially similar to the operation of FIG. 5. The differences include the addition of S201, and replacement of S104 with S204.

At S201, the first image generator 13 obtains document identification information, which is uniquely assigned to a confidential document by the log manager 17 every time a specific job is performed on the confidential document that causes encoding of the distribution destination information.

For example, referring to FIG. 11, the log manager 17 may include a log information database 17a, which stores log information regarding a job performed on the confidential document. The log information database 17a may be implemented by any desired memory or storage device, which may be provided in the image processing apparatus 1 or outside the image processing apparatus 1 as long as it is accessible by the image processing apparatus 1. Still referring to FIG. 11, the log information database 17a includes various kinds of log information including log identification information ("LOG ID"), document identification information ("DOCUMENT ID"), event information ("EVENT"), first user identification information ("FIRST USER ID"), date and time information ("DATE AND TIME"), machine identification information ("MACHINE ID"), original data information ("ORIGINAL DATA"), distribution information ("DISTRIBUTED"), second user identification information ("SECOND USER ID"), receipt information ("RECEIVED"), and destroy information ("DESTROY").

The log identification information is arbitrarily assigned to a job when the job is performed on the confidential document.

The document identification information is uniquely assigned to the confidential document when the confidential document is generated or its contents is changed. For example, the log manager 17 assigns a document ID to the confidential document as long as the first image encoded with the distribution destination information is changed. The log manager 17 may determine whether to change the distribution destination information, for example, when the destination data obtainer 12 obtains the user identification information at S102.

In the example case illustrated in FIG. 11, it is assumed that the user "John" instructs the image processing apparatus 1 having the machine ID aaa-bbb to generate the confidential document from data having the electronic document ID xxx-yyy for a plurality of users including James, Mike, and Jacob. In such case, the confidential document having the user identification information of James is assigned with 0001-0001. The confidential document having the user identification information of Mike is assigned with 0001-0002. The confidential document having the user identification information of Jacob is assigned with 0001-0003.

The event information specifies the type of job being performed on the confidential document, for example, printing, scanning, copying, reprinting, etc. The date and time information indicates the date and time when the job is performed on the confidential document. The machine identification information identifies a machine that performs the job, such as an ID number that is uniquely assigned to the image processing apparatus 1. The original data information includes an electronic document ID that is uniquely assigned to the document data from which the confidential document is generated and a paper document ID that is uniquely assigned to the confidential document when the confidential document is generated from the document data. The electronic document ID may be assigned by an application at the time of generating the document data or assigned by the server SV at the time of storing the document data in a memory of the server SV.

The first user identification information identifies a first user who instructs to perform the job. The second user identification information identifies a second user who will have the confidential document after the job is performed, which may be obtained by the destination data obtainer 12 at S102. In one example, the second user identification information may include information regarding at least one of a user who will receive the confidential document directly from the first user who has generated the confidential document, and a user who will have the confidential document, in any form, indirectly from the first user who has generated the confidential document via the user who has received the confidential document.

The distribution information, which may be expressed by the flag value, indicates whether the confidential document has been distributed by the first user. The receipt information, which may be expressed by the flag value, indicates whether the confidential document has been received by the second user. The destroy information, which may be expressed by the flag value, indicates whether the confidential document has been destroyed Referring back to FIG. 10, at S204, the first image generator 13 generates a first image, which is imperceptible to the human, using the document identification information obtained at S201 in addition to or in alternative to the user identification information.

The operation of FIG. 10 may be performed in various other ways. For example, the steps of the operation of FIG. 10 may be performed in an order different from the order described above.

In another example, at S201, the first image generator 13 may obtain the log identification information in alternative to the document identification information as long as the log identification information is stored in a corresponding manner with the second user identification information specifying a user who will have the confidential document.

Figure 12:
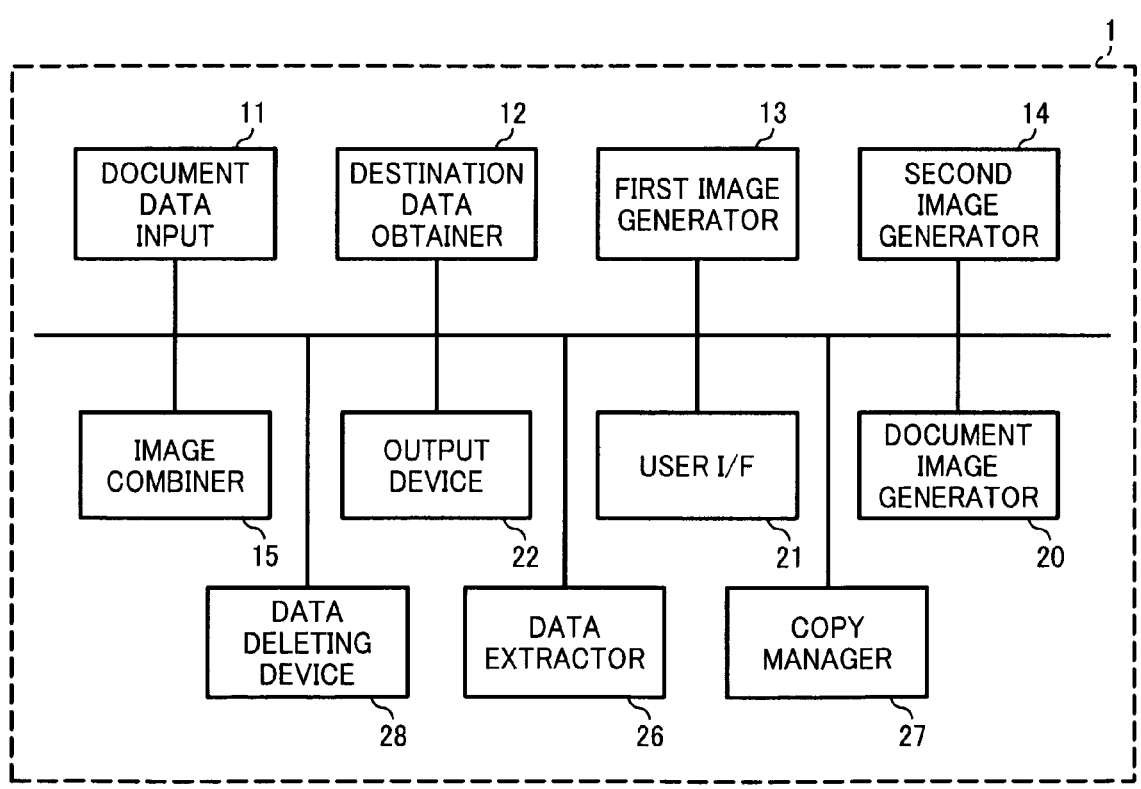
FIG. 12 is a schematic block diagram illustrating the image processing apparatus shown in FIG. 1, according to an example embodiment of the present invention.

Referring now to FIG. 12, a functional structure of the image processing apparatus 1 of FIG. 2 is explained according to an example embodiment of the present invention. More specifically, upon loading the confidential document processing program, the image processing apparatus 1 may be caused to have the functional structure shown in FIG. 12. The image processing apparatus 1 of FIG. 12 is substantially similar to the image processing apparatus 1 of FIG. 3. The differences include the addition of a data extractor 26, a copy manager 27, and a data deleting device 28. Although not shown in FIG. 12, any one of the document use manager 16 and the log manager 17 may be optionally provided in the image processing apparatus 1.

The data extractor 26 determines whether the document data being obtained from the confidential document by the document data input 11 includes the first image encoded with information such as distribution destination information. When the first image is detected, the data extractor 26 decodes the first image to extract the information being encoded. Alternatively or additionally, the data extractor 26 may determine whether the document data includes the second image having the user identification information. When the second image is detected, the data extractor 26 may extract the user identification information. The data being extracted by the data extractor 26 may be stored in any desired memory, such as the RAM 126 (FIG. 2).

The copy manager 27 determines whether the confidential document being obtained by the document data input 11 is prohibited from being copied, for example, by using information obtainable from the first image, the second image, and/or information obtainable from any other source such as a user instruction or information from the server SV.

The data deleting device 28 deletes the first image and/or the second image from the document data. The data deleting device 28 may be optionally provided.

Figure 13:
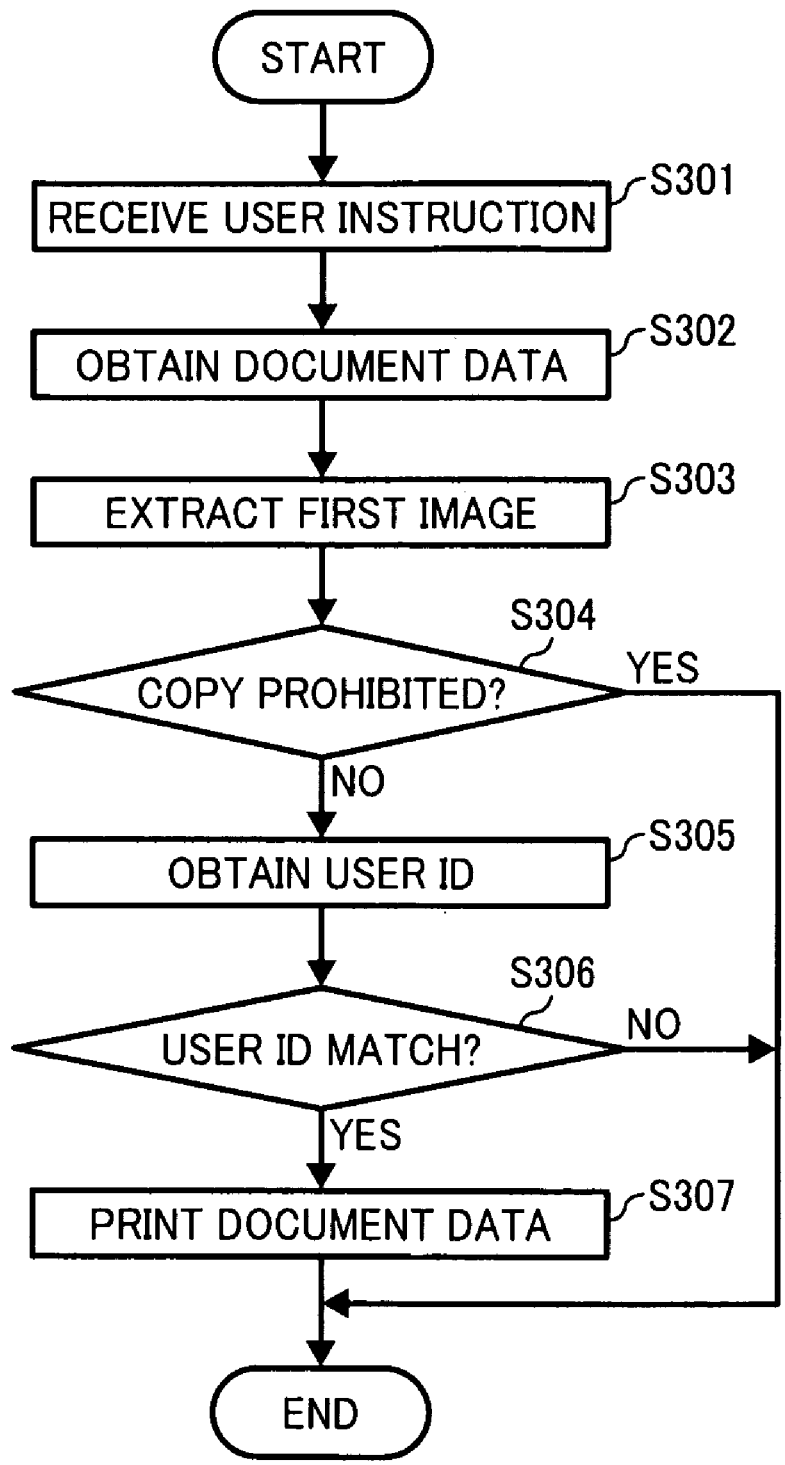
FIG. 13 is a flowchart illustrating operation of managing copying of a confidential document, according to an example embodiment of the present invention.

Referring now to FIG. 13, operation of managing copying of a confidential document, performed by the image processing apparatus 1, is explained according to an example embodiment of the present invention.

At S301, the image processing apparatus 1 receives a user instruction for copying a confidential document. For example, the user may place the confidential document onto an original tray of the ADF or on an exposure glass of the scanner 112, and inputs a user instruction for copying through the input/output device 114. When the user instruction is input, the scanner 112 may be caused to scan the confidential document into scanned data as document data under control of the CPU 124. The image processor 122 may apply processing to the scanned data as needed. The document data may be stored in a memory such as the RAM 126.

At S302, the document data input 11 obtains the document data obtained by the scanner 112.

At S303, the data extractor 26 determines whether the confidential document includes the first image. When the first image is detected, the data extractor 26 extracts information from the first image by decoding the first image. In this example, detection of the first image may be performed in any known method such as pattern matching. The information obtained from the first image may be stored in a memory such as the RAM 126.

At S304, the copy manager 27 determines whether the decoded information obtained at S303 includes the copy guard information indicating that copying of the confidential document is prohibited. When it is determined that the copy guard information indicating that copying of the confidential document is prohibited is detected ("YES" at S304), the operation ends without copying the confidential document. Alternatively, the confidential document may be printed as a document such that information contained in the confidential document is not imperceptible to the human, for example, by printing the document as black solid image. When it is determined that the copy guard information indicating that copying of the confidential document is prohibited is not detected ("NO" at S304), the operation proceeds to S305.

At S305, the destination data obtainer 12 obtains user identification information using the decoded information obtained at S303. In one example, the destination data obtainer 12 obtains user identification information of a user, which is encoded as a user who will have the confidential document at the time when the confidential document is generated. In another example, the destination data obtainer 12 obtains user identification information of a user, which is encoded as a user who generates the confidential document at the time when the confidential document is generated.

At S306, the destination data obtainer 12 may determine whether the user identification information being extracted from the first image matches a user who inputs the user instruction at S301. For example, the user identification information of the user who inputs the user instruction may be obtained, for example, through the input/output device 114 or through the storage device 146 as described above referring to FIG. 5. When it is determined that the user identification information extracted from the first image matches the user who inputs the user instruction ("YES" at S306), the operation proceeds to S307. When it is determined that the user identification information extracted from the first image does not match the user who inputs the user instruction ("NO" at S306), the operation ends without copying the confidential document.

At S307, the output device 22 forms an image of the document data obtained from the confidential document on a recording sheet, and the operation ends.

The operation of FIG. 13 may be performed in various other ways. For example, steps of FIG. 13 may be performed in an order different from the order described above. In another example, S305 and S306 may not be performed.

In another example, at S305, the destination data obtainer 12 may obtain user identification information from any source other than the confidential document itself. In one example, when the decoded information obtained from the confidential document includes document identification information, the destination data obtainer 12 may obtain user identification information through the log manager 17, which may be provided inside or outside of the image processing apparatus 1, as described above referring to FIG. 10.

As described above referring to FIG. 13, even after the confidential document is distributed to a user other than a user who has generated the confidential document, the confidential document is prohibited from being copied unless the user who instructs to copy matches the user identification information being extracted from the confidential document. This may prevent any third person other than the user who is previously selected as a user who will have the confidential document from copying the confidential document.

Figure 14:
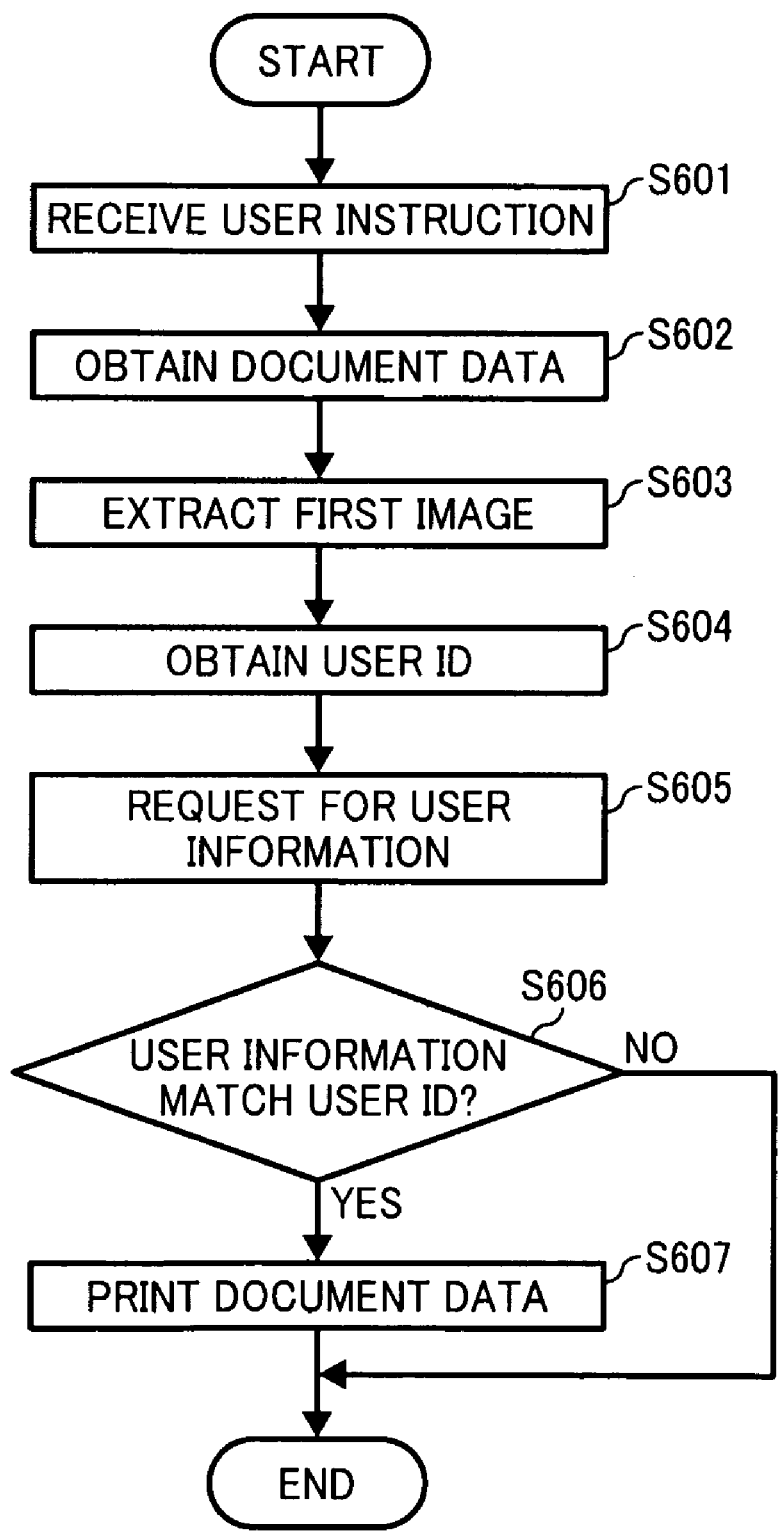
FIG. 14 is a flowchart illustrating operation of managing copying of a confidential document, according to an example embodiment of the present invention.

Referring now to FIG. 14, operation of managing copying of a confidential document, performed by the image processing apparatus 1, is explained according to an example embodiment of the present invention.

At S601, the image processing apparatus 1 receives a user instruction for copying a confidential document in a substantially similar manner as described above referring to S301 of FIG. 13.

At S602, the document data input 11 obtains the document data obtained by the scanner 112.

At S603, the data extractor 26 determines whether the confidential document includes the first image, and extracts the first image to obtain decoded information in a substantially similar manner as described above referring to S303 of FIG. 13.

At S604, the destination data obtainer 12 extracts user identification information using the decoded information obtained at S603, in a substantially similar manner as described above referring to S305 of FIG. 13.

At S605, the user interface 21 requests the user to input user information regarding one or more users that the user intends to distribute the confidential document after being printed, for example, through the input/output device 114.

At S606, the destination data obtainer 12 may determine whether the user information input at S605 matches the user identification information being obtained using the first image at S604. When it is determined that the user information matches the user identification information ("YES" at S606), the operation proceeds to S607. When it is determined that the user information does not match the user identification information ("NO" at S606), the operation ends without copying the confidential document.

At S607, the output device 22 forms an image of the document data obtained from the confidential document on a recording sheet, and the operation ends.

The operation of FIG. 14 may be performed in various other ways. For example, steps of FIG. 14 may be performed in an order different from the order described above. In another example, at S604, the destination data obtainer 12 may obtain user identification information from any source other than the confidential document itself.

In another example, at S605, the user interface 21 may display a list of users who are previously determined to have the confidential document, which is generated using the user identification information obtained at S604, and requests the user to select at least one user from the list of users. In such case, S606 may not be performed.

In another example, at S605, the user interface 21 may display a list of users who are previously determined to have the confidential document, which may be obtained using the destination distribution information obtained at S603. In one example, the user identification information identifying a specific team may be obtained at S603. In such case, at S604, the destination data obtainer 12 obtains the user identification information for users who belong to the specific team. At S605, the user interface 21 may display a list of users who belong to the specific team for selection. In another example, the meeting information identifying a specific meeting may be obtained at S603. In such case, at S604, the destination data obtainer 12 obtains the user identification information for users who will attend the specific meeting. At S605, the user interface 21 may display a list of users who will attend the specific meeting for selection.

As described above referring to FIG. 14, even after the confidential document is distributed to a second user other than a first user who has generated the confidential document, the confidential document is prohibited from being copied for distribution to a third user unless the third user matches the user identification information being obtained using the first image extracted from the confidential document. This may suppress the second user from distributing to any person who is not authorized by the first user.

Figure 15:
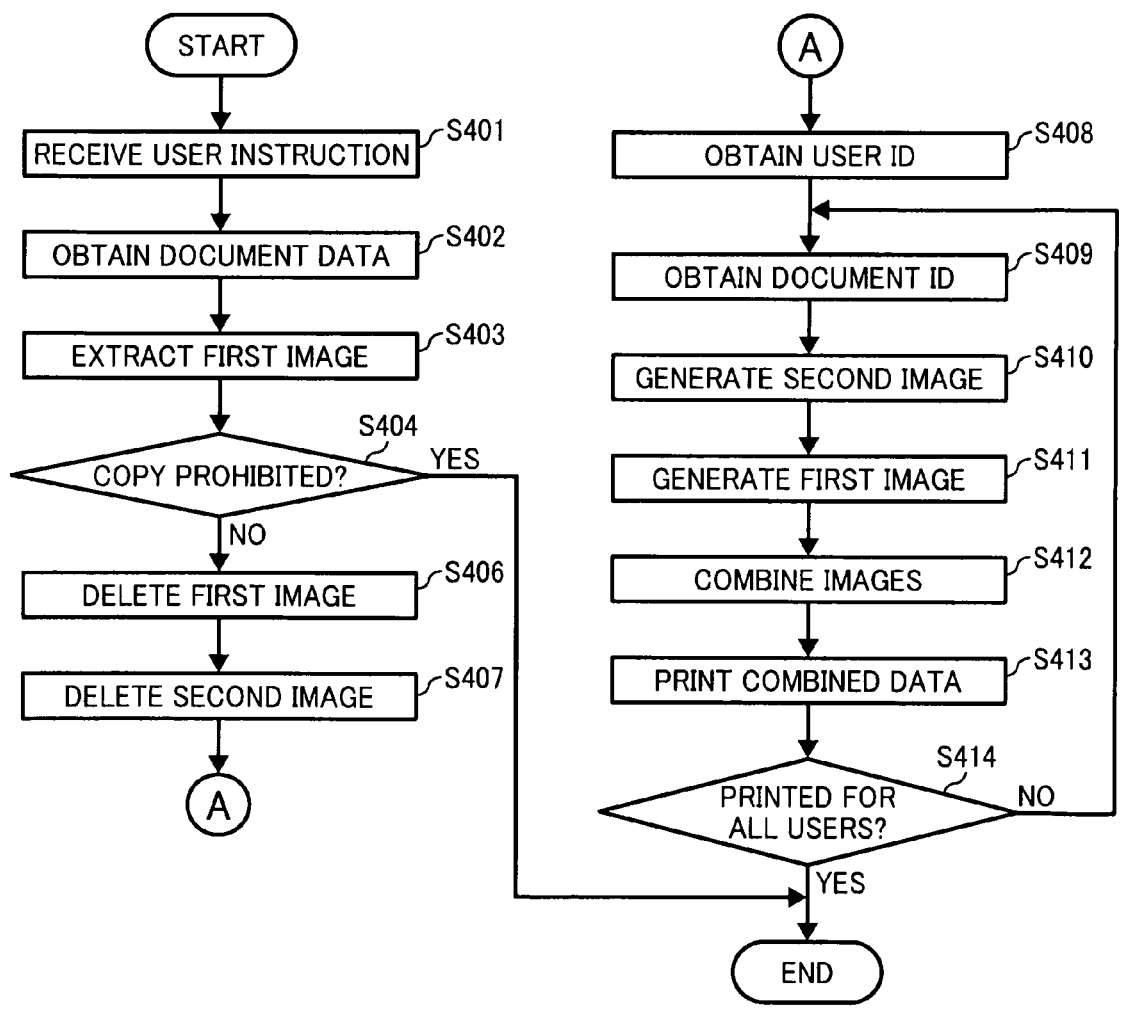
FIG. 15 is a flowchart illustrating operation of managing copying of a confidential document, according to an example embodiment of the present invention.

Referring now to FIG. 15, operation of managing copying of a confidential document, performed by the image processing apparatus 1, is explained according to an example embodiment of the present invention.

S401 to S404 may be performed in a substantially similar manner as described above referring to S301 to S304 of FIG. 13.

When it is determined that the copy guard information indicating that copying of the confidential document is prohibited is not detected ("NO" at S404), the operation proceeds to S406 to delete the first image from the document data, and further to S407 to delete the second image from the document data. The first image and the second image may be deleted by the data deleting device 28 of FIG. 12. The document data from which the first image and the second image are deleted may be stored in any desired memory as the document image.

At S408, the destination data obtainer 12 obtains user identification information using the decoded information obtained at S403. In this example, it is assumed that the destination data obtainer 12 obtains user identification information of a second user who will have the confidential document after the confidential document is printed by a first user who instructs copying. In one example, the user identification information of the second user may be obtained either from the confidential document itself or from the log manager 17 using the document identification information. In another example, the user identification information of the second user may be obtained directly from the first user through the input/output device 114. In another example, the user identification information of the second user may be obtained from the document use manager 16 in a substantially similar manner as described above referring to FIG. 6.

At S409, the first image generator 13 obtains document identification information, for example, from the log manager 17 in a substantially similar manner as described above referring to S201 of FIG. 10. Specifically, the log manager 17 generates a document ID for a confidential document to be generated, and stores the document ID in a corresponding manner with the user identification information obtained at S408 in the log information database 17*a*.

At S410, the second image generator 14 generates a second image containing the user name that matches the user identification information obtained at S408, in a substantially similar manner as described above referring to S105 of FIG. 5.

At S411, the first image generator 13 generates a first image encoded with the document identification information obtained at S409, in a substantially similar manner as described above referring to S204 of FIG. 10.

At S412, the image combiner 15 combines the document image, the first image, and the second image into combine data, in a substantially similar manner as described above referring to S106 of FIG. 5.

At S413, the output device 22 forms an image of the combined data on a recording sheet to generate a confidential document, in a substantially similar manner as described above referring to S107 of FIG. 5.

S414 determines whether the confidential document has been output for all users who will have the confidential document, which is obtained at S408. When the confidential document has been output for all users ("YES" at S414), the operation ends. When the confidential document has not been output for all users ("NO" at S414), the operation returns to S409 to newly select one of the users, and repeat S409 to S413 for the newly selected one of the users.

The operation of FIG. 15 may be performed in various other ways. For example, the steps of the operation of FIG. 15 may be performed in an order different from the order described above.

In another example, S406 and S407 may not be performed. In such case, the image combiner 15 obtains the document image, which is generated at the time of generating the original confidential document, by using the original data information that matches the document identification information extracted from the confidential document. When the confidential document is newly created in this manner, the log manager 17 may store the event information indicating that the confidential document is reprinted ("REPRINT") as illustrated in FIG. 17. Referring to FIG. 17, the log information having the log ID of 0000-0200 indicates that the user "James" reprints the confidential document, which has been generated by the image forming apparatus having the machine ID of aaa-bbb according to a user instruction input by the user "John", using the image forming apparatus having the machine ID of ccc-ddd, for distribution to the user "Mary" as a confidential document having the document ID of 0001-0013.

In another example, when S406 and S407 are not performed, at S411, the first image generator 411 may generate a first image by adding the document identification information obtained at S409 to the first image being obtained from the confidential document. In such case, the first image contains the document identification information for the original confidential document, and the document identification information for the newly created confidential document.

As described above referring to FIG. 15, since the log manager 17 assigns a new document ID to the confidential document as long as the distribution destination information is updated. In this manner, the confidential document may be easily traced even after the confidential document is distributed to the user other than the user who generates the confidential document. Further, since the log manager 17 is capable of storing information regarding a job, which is performed by any image processing apparatus 1 provided on the network N, the confidential document may be easily traced even when the confidential document is distributed to the place remote from the office where the user generating the confidential document works.

Figure 16:
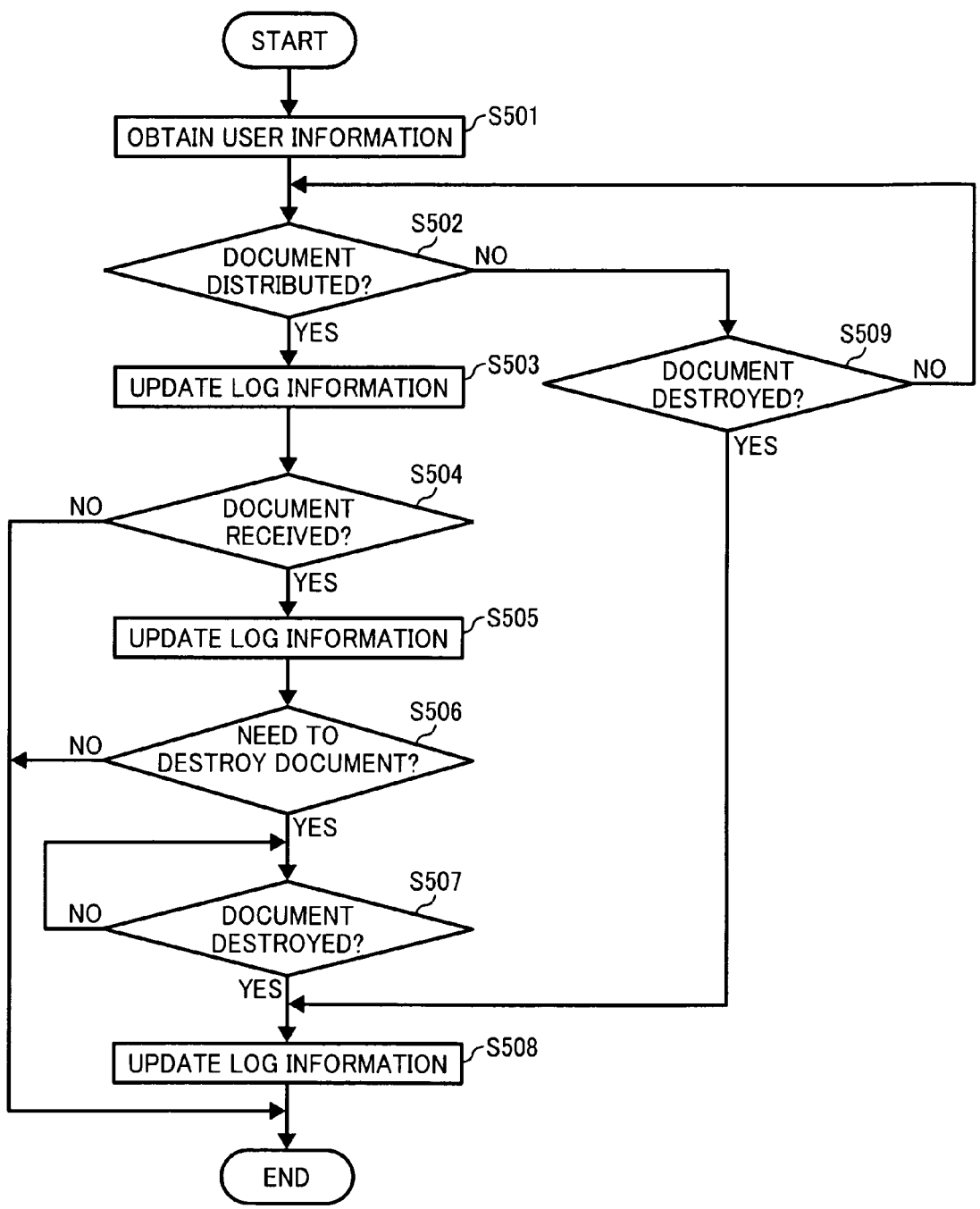
FIG. 16 is a flowchart illustrating operation of sending notification after a confidential document is generated, according to an example embodiment of the present invention.

Referring now to FIG. 16, operation of sending notification to a user, performed by the image processing system 1 is explained, according to an example embodiment of the present invention. For example, the operation of FIG. 16 may be performed by the log manager 17 when the confidential document is generated by the image processing apparatus 1 according to a user instruction. In another example, the operation of FIG. 16 may be performed by an email server and the log manager 17 provided on the network N.

At S501, the log manager 17 obtains user identification information from the destination data obtainer 12 for one or more users including the first user who has instructed to generate the confidential document and the second user who will have the confidential document.

At S502, the log manager 17 determines whether the confidential document has been distributed by the first user to the second user, by sending notification to the first user. For example, the log manager 17 may cause the email server to send an email requesting the first user to reply whether the confidential document has been distributed to the second user. When it is determined that the confidential document has been distributed ("YES" at S502), for example, through a reply email sent by the first user, the operation proceeds to S503. When it is determined that the confidential document has not been distributed ("NO" at S502), for example, through a reply email sent by the first user, the operation proceeds to S509.

At S502, when no reply is received from the first user for a predetermined time period, the operation may repeat S502. Specifically, the log manager 17 may cause the email server to send another email requesting the first user to reply whether the confidential document has been distributed to the second user.

At S503, the log manager 17 updates log information, for example, by changing the value of the distribution information as illustrated in FIG. 17. At this time, the log manager 17 may cause the email server to send an email to the first user, which indicates updating of the distribution information.

At S504, the log manager 17 determines whether the confidential document has been received by the second user, for example, by causing the email server to send an email requesting the second user to reply whether the confidential document has been received. When it is determined that the second user has received the confidential document, for example, through a reply email sent by the second user ("YES" at S504), the operation proceeds to S505. When it is determined that the second user has not received ("NO" at S504), for example, through a reply email sent by the second user, the operation may end or send an email to the first user that the second user has not received the confidential document.

At S504, when no reply is received from the second user for a predetermined time period, the operation may repeat S504.

At S505, the log manager 17 updates log information, for example, by changing the value of the receipt information, for example, as illustrated in FIG. 17. At this time, the log manager 17 may cause the email server to send an email to at least one of the second user and the first user, which indicates updating of the receipt information.

At S506, the log manager 17 determines whether the confidential document being distributed to the second user needs to be destroyed. For example, the first user may input information indicating whether to require the second user to destroy the confidential document after distribution, through the user interface 21, for example, at the time of generating the confidential document. Such information may be stored in a manner accessible from the log manager 17. When it is determined that the confidential document needs to be destroyed ("YES" at S506), the operation proceeds to S507. When it is determined that the confidential document needs not to be destroyed ("NO" at S506), the operation ends.

At S507, the log manager 17 determines whether the confidential document has been destroyed by the second user, for example, by causing the email server to send an email requesting the second user to reply whether the confidential document has been destroyed. When it is determined that the second user has destroyed the confidential document, for example, through a reply email sent by the second user ("YES" at S507), the operation proceeds to S508. When it is determined that the second user has not destroyed the confidential document ("NO" at S507), for example, through a reply email sent by the second user, the operation may repeat S507 or send an email to the first user that the second user has not destroyed the confidential document.

At S508, the log manager 17 updates log information, for example, by changing the value of the destroy information, for example, as illustrated in FIG. 17, and the operation ends. At this time, the log manager 17 may cause the email server to send an email to at least one of the second user and the first user, which indicates updating of the destroy information.

Referring back to S502, when it is determined that the confidential document has not been distributed by the user ("NO" at S502), the operation may proceed to S509 to determine whether the confidential document has been destroyed by the first user, for example by causing the email server to send an email requesting the first user to reply whether the confidential document has been destroyed. When it is determined that the first user has destroyed the confidential document, for example, through a reply email sent by the first user ("YES" at S509), the operation proceeds to S508. In such case, the email is sent only to the first user. When it is determined that the first user has not destroyed the confidential document ("NO" at S509), for example, through a reply email sent by the first user, the operation may repeat S509.

The operation of FIG. 16 may be performed in various other ways. For example, S507 or S509 of determining whether the confidential document has destroyed may be determined based on information sent from a document destroy device, such as a shredder, when the document destroy device is coupled to the log manager 17 through the network N. In one example, the document destroy device may send information regarding whether the confidential document has been destroyed by the first user or the second user when a request is received from the log manager 16. Alternatively, the document destroy device may automatically send information indicating that the confidential document has been destroyed by the first user or the second user when the confidential document is destroyed or at predetermined timing. In order to cause the document destroy device to function as described above, the document destroy device is provided with a data extractor that is substantially similar to the data extractor 26, which is capable of extracting the first image encoded with the destination distribution information. The extracted destination distribution information may be sent to the log manger 17.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In another example, in alternative or in addition to managing copying of the confidential document after the confidential document is generated, the image processing system of FIG. 1 may manage distribution of the confidential document in various other ways. For example, when the user who has received the confidential document in the electronic form instructs the image processing apparatus 1 to print the confidential document, the image processing apparatus 1 may determine whether to allow printing according to any information decodable from the first image such as the distribution destination information. In another example, when the user who has received the confidential document in the paper form instructs the image processing apparatus 1 to fax the confidential document to a user who will have the confidential document, the image processing apparatus 1 may determine whether to allow faxing according to any information decodable from the first image such as the distribution destination information. In another example, when the user who has received the confidential document in the electronic form or paper form instructs the image processing apparatus 1 to store the confidential document in its memory or any memory on the network N, the image processing apparatus 1 may determine whether to allow storing according to any information decodable from the first image such as the distribution destination information.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing apparatus, comprising:
 a document image generator configured to generate a document image from data to be processed into a confidential document;
 a destination data obtainer configured to obtain distribution destination information specifying a destination to which the confidential document will be distributed;
 a first image generator configured to generate a first image encoded with the distribution destination information and being imperceptible to the human;
 an image combining device configured to combine the document image and the first image into combined data;
 an output device configured to output the combined data as the confidential document for distribution to the destination specified by the distribution destination information;
 a log manager configured to generate confidential document identification information when a specific job is performed on the confidential document and to send the confidential document identification information to the destination data obtainer, wherein the distribution destination information includes the confidential document identification information; and
 a storage device configured to store confidential document log information related to the specific job performed on the confidential document, and user identification information identifying at least one of a user who has instructed to perform the specific job and a user who will have the confidential document after the specific job is performed, in a corresponding manner with respect to the confidential document identification information.

2. The apparatus of claim 1, wherein the distribution destination information includes at least one of user identification information identifying a specific user who will have the confidential document, identification information identifying an organization to which a user who will have the confidential document belongs, and the confidential document identification information uniquely assigned to the confidential document.

3. The apparatus of claim 2, further comprising:
a second image generator configured to obtain the user identification information identifying a specific user who will have the confidential document using the distribution destination information, and to generate a second image having the user identification information and being perceptible to the human, wherein the combined image is generated by combining the document image, the first image, and the second image.

4. The apparatus of claim 1, further comprising:
a user interface configured to receive a user instruction for copying the confidential document from a user;
a scanner device configured to scan the confidential document into confidential document data;
a data extractor configured to extract distribution destination information from the confidential document data when the distribution destination information is detected in the confidential document data; and
a copy manager configured to determine whether the user who has input the user instruction for copying the confidential document matches a user identified using the distribution destination information being extracted from the confidential document data.

5. The apparatus of claim 4, wherein:
the user interface is further configured to request the user who has input the user instruction for copying the confidential document to provide user identification information identifying a user who will have the copy of the confidential document and to receive from the user a response including the user identification information identifying a user who will have the copy of the confidential document,
wherein the copy manager is further configured to determine whether a user identified using the distribution destination information being extracted from the confidential document data matches the user identification information being received by the user through the response.

6. The apparatus of claim 5, further comprising:
a data deleting device configured to delete the distribution destination information from the confidential document data,
wherein the destination data obtainer is further configured to obtain newly generated confidential document identification information as newly generated distribution destination information, the newly generated confidential document identification information being stored by the log manager in a corresponding manner with the user identification information of the user who will have the copy of the confidential document, and
wherein the output device is further configured to output a confidential document being encoded with the newly generated distribution destination information.

7. The apparatus of claim 1, wherein:
the log manager is further configured to send notification to at least one of the user who will have the confidential document and the user who has instructed to perform the specific job, to determine whether information is received in response to the notification, and to update the confidential document log information based on the determination,
the notification including at least one of:
notification requesting information regarding whether the user who has instructed has distributed the confidential document to the user who will have the confidential document;
notification requesting information regarding whether the user who will have the confidential document has received the confidential document from the user who has instructed;
notification requesting information regarding whether the user who has instructed has destroyed the confidential document; and
notification requesting information regarding whether the user who will have the confidential document has destroyed the confidential document.

8. An image processing apparatus, comprising:
a document image generator configured to generate a document image from data to be processed into a confidential document;
a destination data obtainer configured to obtain distribution destination information specifying a destination to which the confidential document will be distributed;
a first image generator configured to generate a first image encoded with the distribution destination information and being imperceptible to the human;
an image combining device configured to combine the document image and the first image into combined data;
an output device configured to output the combined data as the confidential document for distribution to the destination specified by the distribution destination information;
a storage device configured to store meeting information for identifying a meeting at which the confidential document will be distributed, and user identification information identifying a user who is scheduled to attend the identified meeting in a corresponding manner;
a user interface configured to receive a user instruction for processing the data into the confidential document; and
a confidential document use information manager configured to determine whether the user instruction includes the meeting information, and to send the user identification information that corresponds to the meeting information being extracted from the user instruction to the destination data obtainer, wherein the distribution destination information includes the user identification information that corresponds to the meeting information.

9. An image processing system, comprising:
a document image generator configured to generate a document image from data to be processed into a confidential document;
a destination data obtainer configured to obtain distribution destination information specifying a destination to which the confidential document will be distributed;
a first image generator configured to generate a first image encoded with the distribution destination information and being imperceptible to the human;
an image combining device configured to combine the document image and the first image into combined data;
an output device configured to output the combined data as the confidential document for distribution to the destination specified by the distribution destination information;
a log manager configured to generate confidential document identification information when a specific job is performed on the confidential document and to send the confidential document identification information to the destination data obtainer, wherein the distribution destination information includes the confidential document identification information; and
a storage device configured to store confidential document log information related to the specific job performed on the confidential document, and user identification information identifying at least one of a user who has instructed to perform the specific job and a user who will have the confidential document after the specific job is performed, in a corresponding manner with respect to the confidential document identification information.

10. The system of claim 9, further comprising:
a storage device configured to store confidential document use information related to the intended use of the confidential document and user identification information identifying a user who will have the confidential document in a corresponding manner;
a user interface configured to receive a user instruction for processing the data into the confidential document; and
a confidential document use information manager configured to determine whether the user instruction includes the confidential document use information, and to send the user identification information that corresponds to the confidential document use information being extracted from the user instruction to the destination data obtainer,
wherein the distribution destination information includes the user identification information.

11. The system of claim 9, wherein:
the log manager is further configured to send notification to at least one of the user who will have the confidential document and the user who has instructed to perform the specific job, to determine whether information is received in response to the notification, and to update the confidential document log information based on the determination,
the notification including at least one of:
notification requesting information regarding whether the user who has instructed has distributed the confidential document to the user who will have the confidential document;
notification requesting information regarding whether the user who will have the confidential document has received the confidential document from the user who has instructed;
notification requesting information regarding whether the user who has instructed has destroyed the confidential document; and
notification requesting information regarding whether the user who will have the confidential document has destroyed the confidential document.

12. An image processing method, comprising:
generating a document image from data to be processed into a confidential document;
obtaining distribution destination information specifying a destination to which the confidential document will be distributed;
generating a first image encoded with the distribution destination information and being imperceptible to the human;
combining the document image and the first image into combined data;
outputting the combined data as the confidential document for distribution to the destination specified by the distribution destination information;
generating confidential document identification information when a specific job is performed on the confidential document; and
storing confidential document log information related to the specific job being performed on the confidential document, and user identification information identifying at least one of a user who has instructed to perform the specific job and a user who will have the confidential document after the specific job is performed, in a corresponding manner with respect to the confidential document identification information, wherein the distribution destination information includes the confidential document identification information.

13. The method of claim 12, further comprising:
obtaining user identification information identifying a specific user who will have the confidential document using the distribution destination information; and
generating a second image having the user identification information and being perceptible to the human,
wherein the combining the document image and the first image into combined data includes combining the document image, the first image, and the second image into the combined data.

14. The method of claim 12, wherein the obtaining distribution destination information specifying a destination to which the confidential document will be distributed comprises;
storing confidential document use information related to the intended use of the confidential document and user identification information identifying a user who will have the confidential document in a corresponding manner;
receiving a user instruction for processing the data into the confidential document;
determining whether the user instruction includes the confidential document use information; and
obtaining the user identification information that corresponds to the confidential document use information being extracted from the user instruction, wherein the distribution destination information includes the user identification information.

15. The method of claim 12, further comprising:
receiving a user instruction for copying the confidential document from a user;
scanning the confidential document into confidential document data; extracting distribution destination information from the confidential document data when the distribution destination information is detected in the confidential document data; and
determining whether the user who has input the user instruction for copying the confidential document matches a user identified using the distribution destination information being extracted from the confidential document data.

16. The method of claim 15, further comprising:
requesting the user who has input the user instruction for copying the confidential document to provide user identification information identifying a user who will have the copy of the confidential document;
receiving from the user a response including the user identification information identifying a user who will have the copy of the confidential document; and
determining whether a user identified using the distribution destination information being extracted from the confidential document data matches the user identification information being received by the user through the response.

* * * * *